(12) United States Patent
Mizuta

(10) Patent No.: US 9,551,862 B2
(45) Date of Patent: Jan. 24, 2017

(54) SCANNING MICROSCOPE

(71) Applicant: NIKON CORPORATION, Tokyo (JP)

(72) Inventor: Masahiro Mizuta, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/040,081

(22) Filed: Sep. 27, 2013

(65) Prior Publication Data
US 2014/0092459 A1 Apr. 3, 2014

Related U.S. Application Data

(63) Continuation of application No. PCT/JP2012/058321, filed on Mar. 29, 2012.

(30) Foreign Application Priority Data

Mar. 31, 2011 (JP) .................. 2011-077527

(51) Int. Cl.
*G02B 21/00* (2006.01)
*G02B 26/08* (2006.01)

(52) U.S. Cl.
CPC ......... *G02B 21/0048* (2013.01); *G02B 21/002* (2013.01); *G02B 26/0816* (2013.01); *G02B 26/0833* (2013.01)

(58) Field of Classification Search
CPC .............. G02B 21/00; G02B 21/002–21/0036; G02B 21/0048; G02B 26/08; G02B 26/0816; G02B 26/0833; G02B 26/0875; G02B 26/10–26/105

(Continued)

(56) References Cited

U.S. PATENT DOCUMENTS 6,211,988 B1 * 4/2001 Engelhardt et al. ....... 359/201.1
6,459,484 B1 10/2002 Yokoi
(Continued)

FOREIGN PATENT DOCUMENTS

JP 6-43369 2/1994
JP 9-304700 11/1997
(Continued)

OTHER PUBLICATIONS

International Search Report mailed Jun. 12, 2012 in corresponding International Application No. PCT/JP2012/058321.
(Continued)

*Primary Examiner* — Bumsuk Won
*Assistant Examiner* — Ephrem Mebrahtu

(57) ABSTRACT

There is provided a scanning microscope so configured that when the position of the exit pupil of an imaging optical system and a position conjugate to the exit pupil change, the position of the rotation center of a scanned light flux is moved and follows the changed exit pupil position. A scanning microscope includes a light source, an objective lens, and a scan unit. The scan unit includes first to fourth deflectors, and the deflection angle of illumination light deflected off each of the first to fourth deflectors is so controlled that the pivotal point of the illumination light deflected off each of the first and second deflectors and the pivotal point of the illumination light deflected off each of the third and fourth deflectors substantially coincide with the exit pupil of the objective lens or a position conjugate to the exit pupil.

18 Claims, 17 Drawing Sheets

(58) Field of Classification Search
USPC .......... 359/362, 368, 385–390, 196.1, 197.1, 359/201.1–203.1
See application file for complete search history.

(56) References Cited

U.S. PATENT DOCUMENTS

| | | |
|---|---|---|
| 8,520,280 B2 | 8/2013 | Engelhardt |
| 2010/0142780 A1* | 6/2010 | Yasuno et al. ................ 382/131 |
| 2010/0224794 A1* | 9/2010 | Yajima et al. ............. 250/458.1 |
| 2011/0249311 A1 | 10/2011 | Engelhardt |

FOREIGN PATENT DOCUMENTS

| | | |
|---|---|---|
| JP | 2001-91848 | 4/2001 |
| JP | 2001-255463 | 9/2001 |
| JP | 2006-106337 | 4/2006 |
| WO | 2010/069987 | 6/2010 |

OTHER PUBLICATIONS

Written Opinion of the International Searching Authority dated Jun. 12, 2012 in corresponding PCT Application No. PCT/JP2012/058321.

* cited by examiner

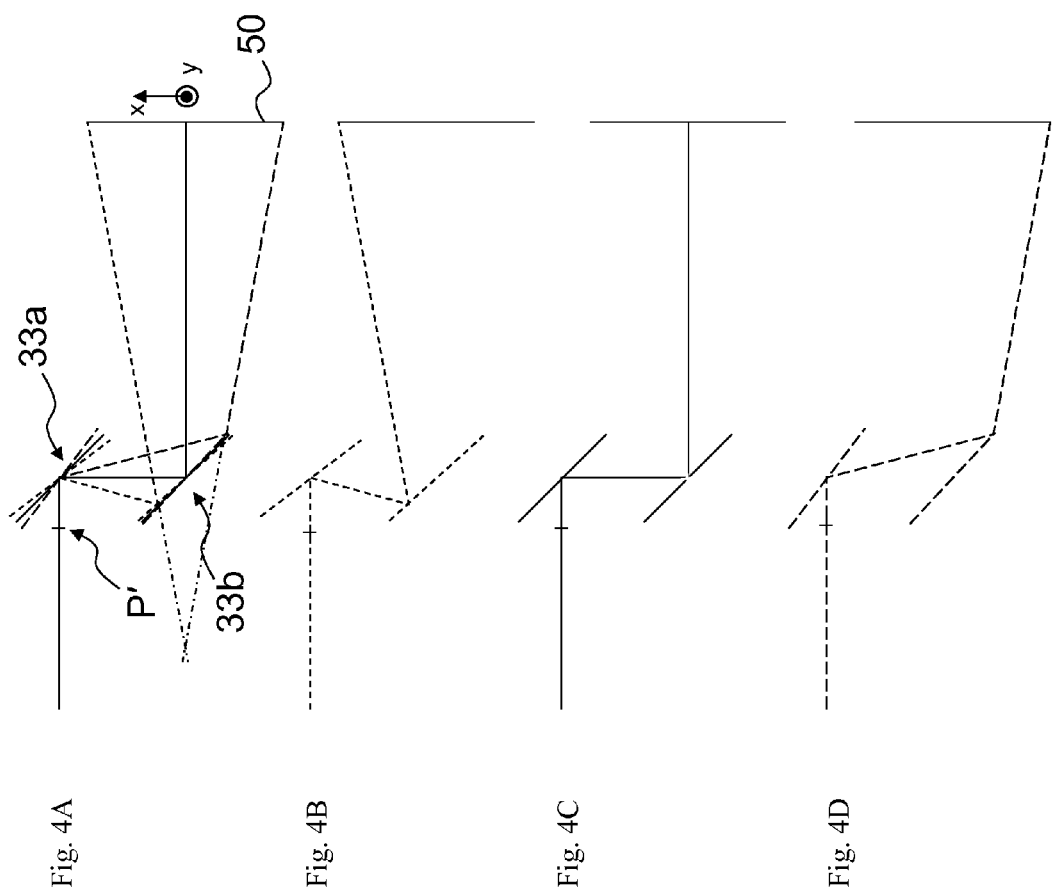

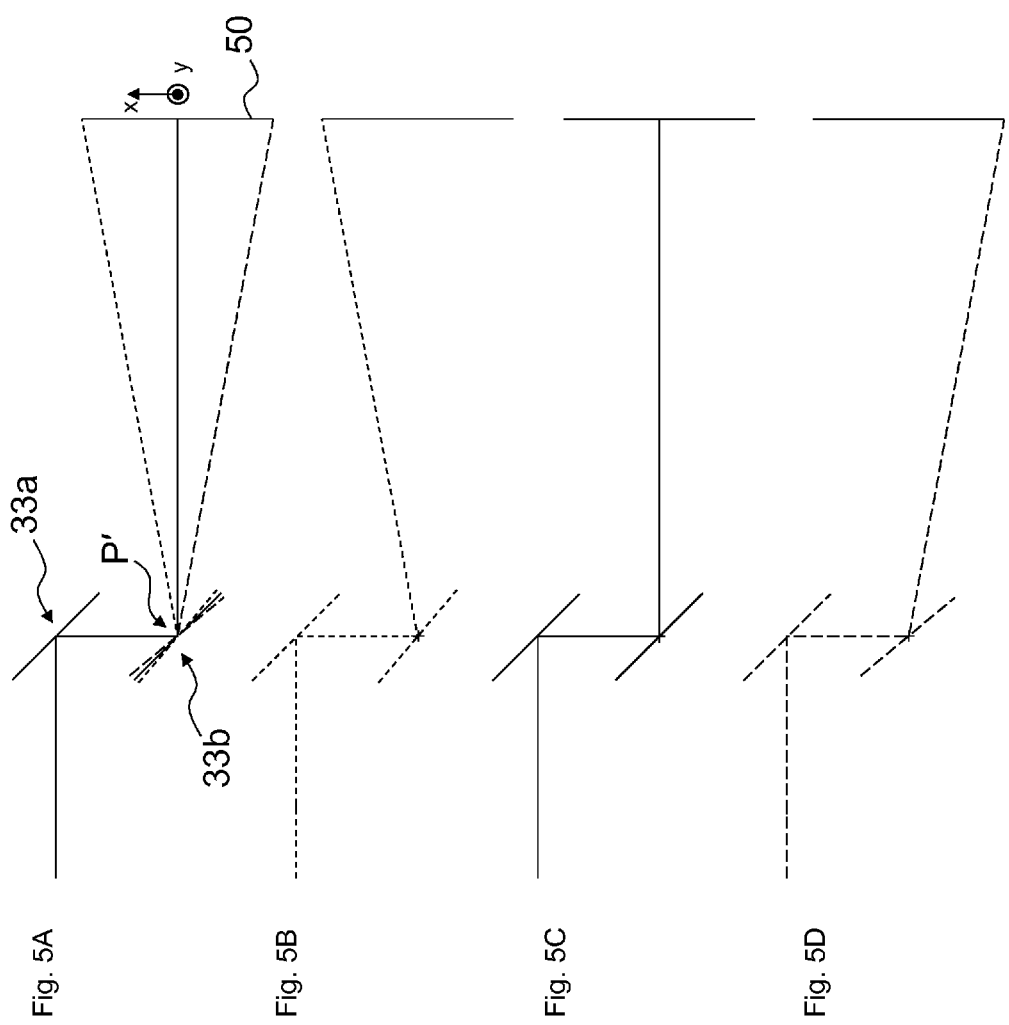

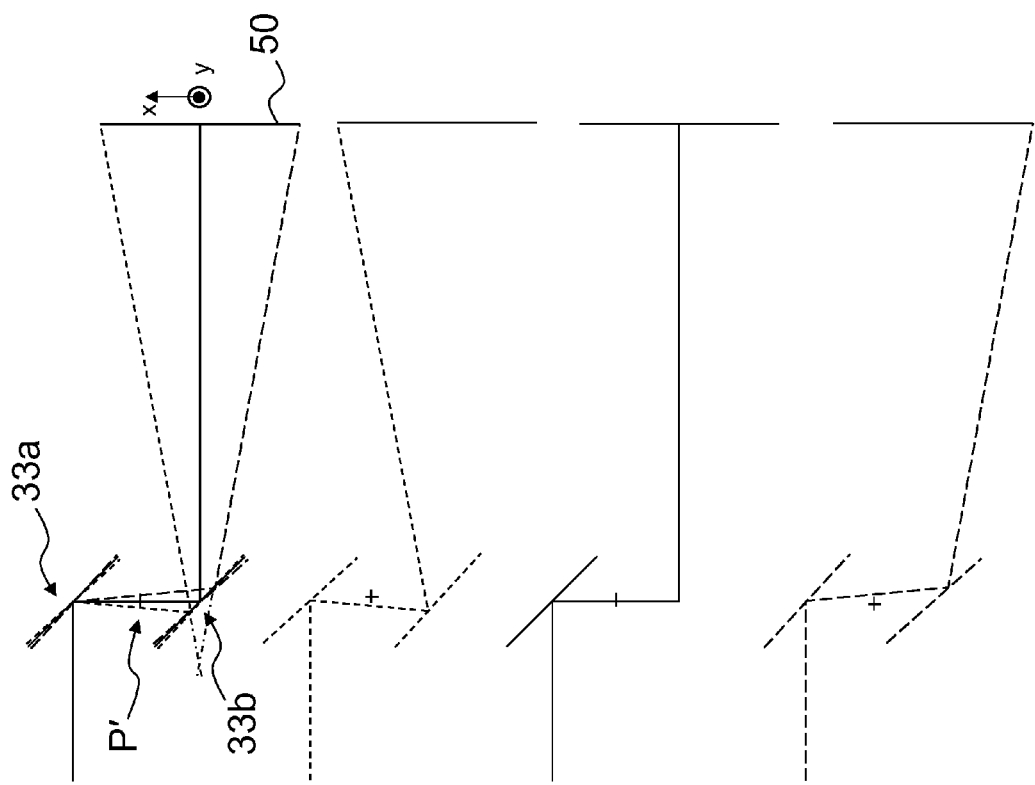

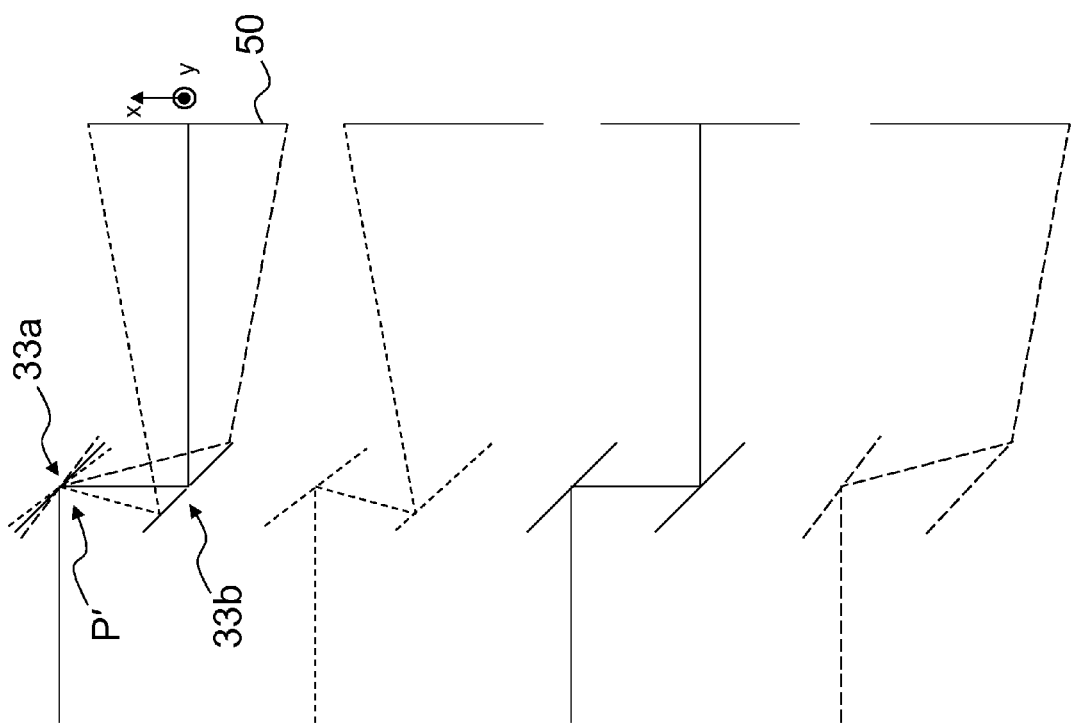

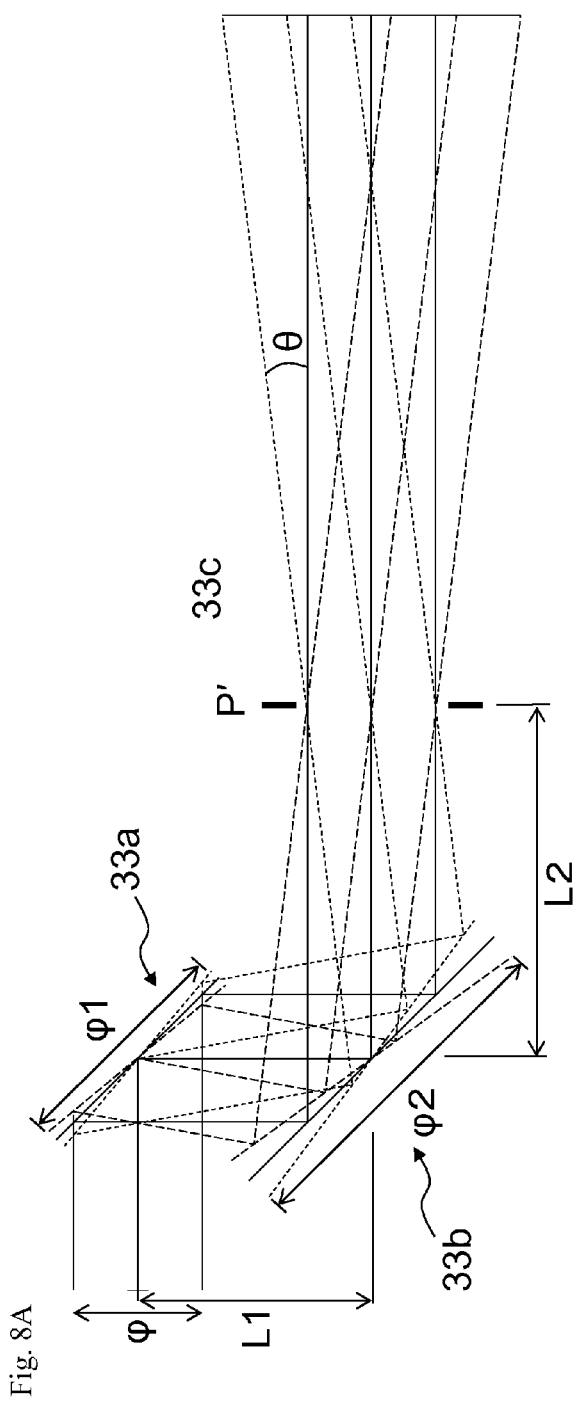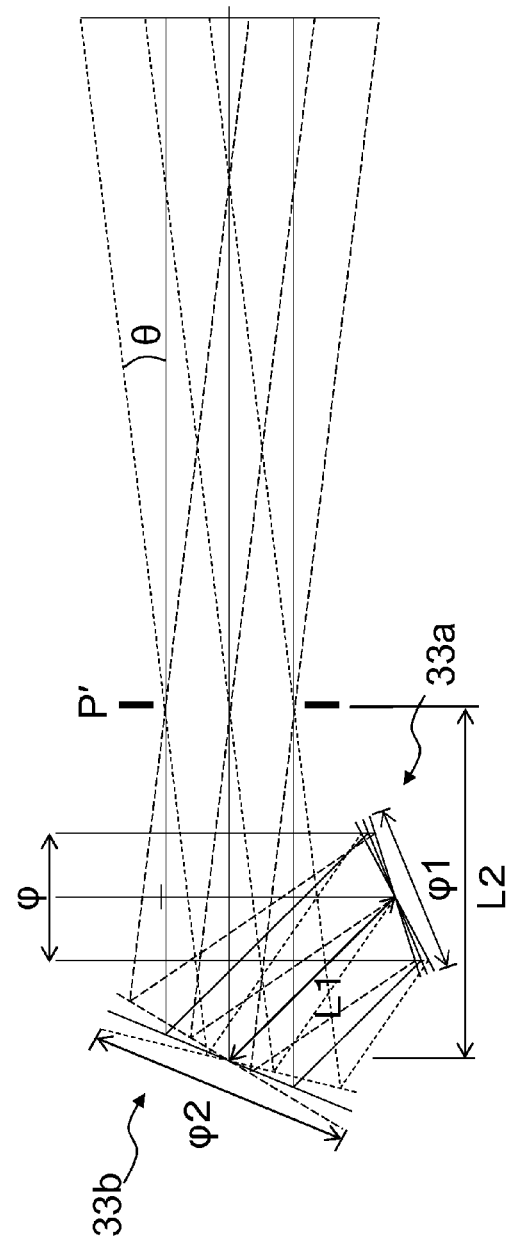

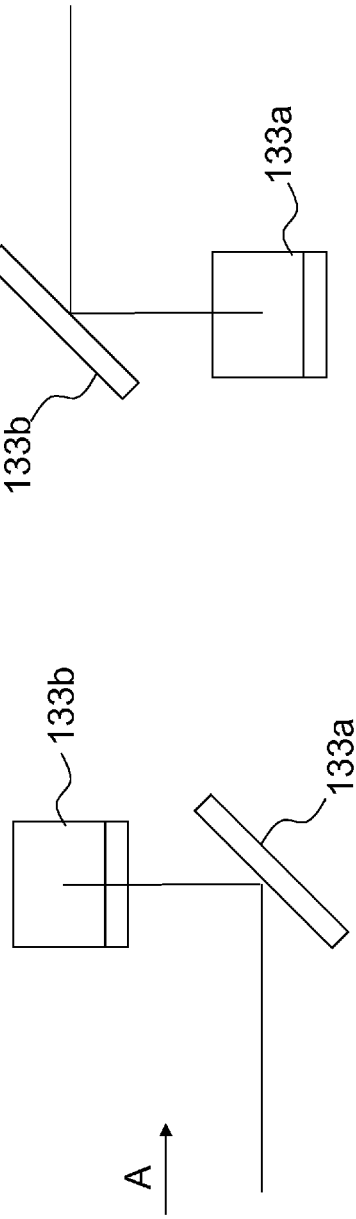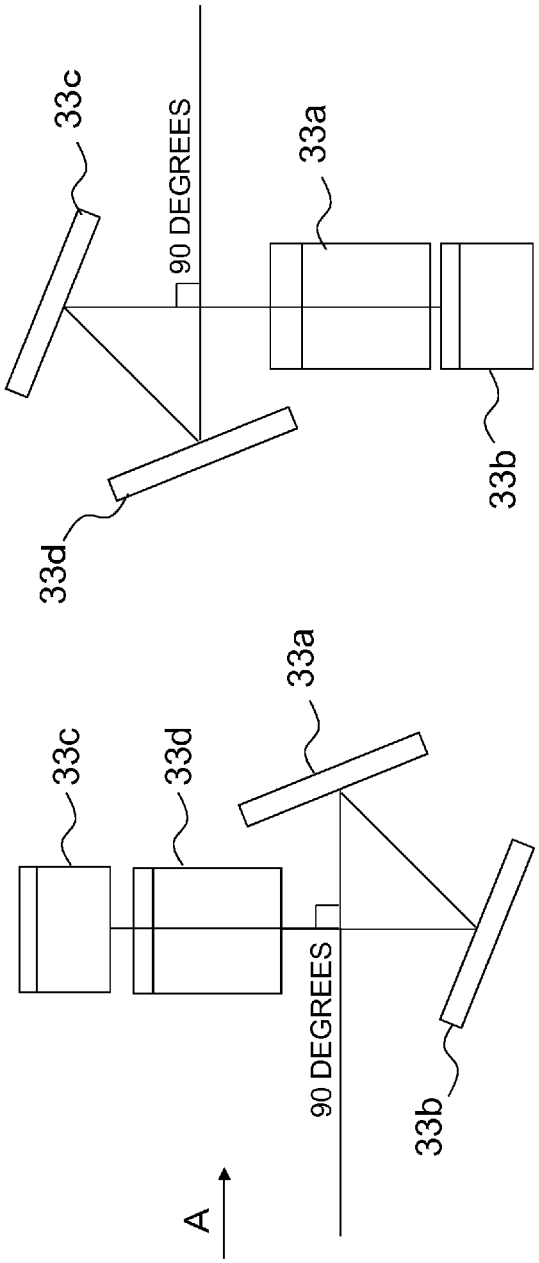
Fig. 9A  CONVENTIONAL CONFIGURATION
Fig. 9B  COFIGRATION IN PRESENT EMBODIMENT

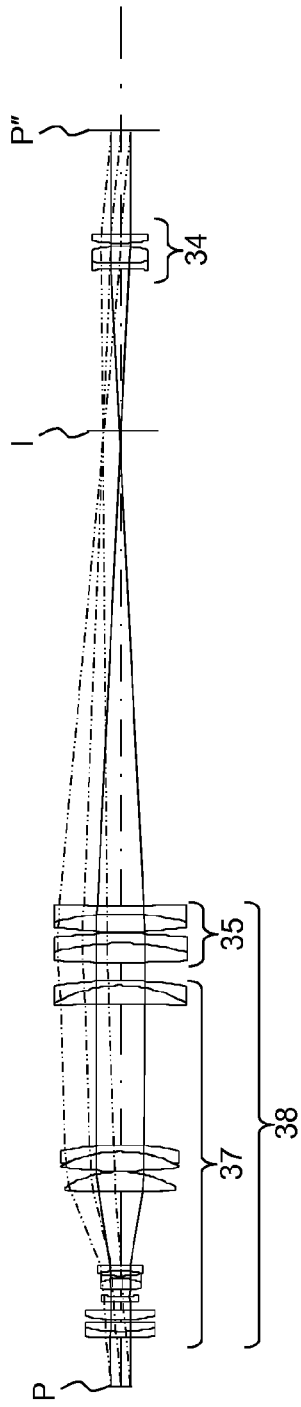
Fig. 10A f = 60mm
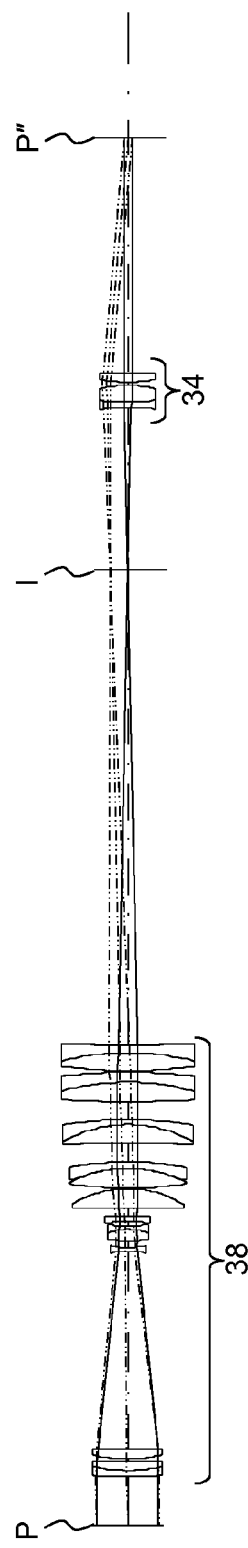
Fig. 10B f = 450mm

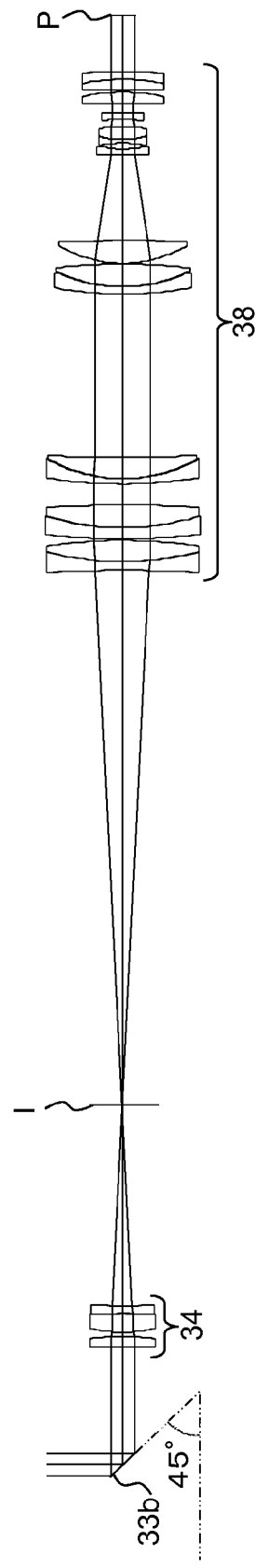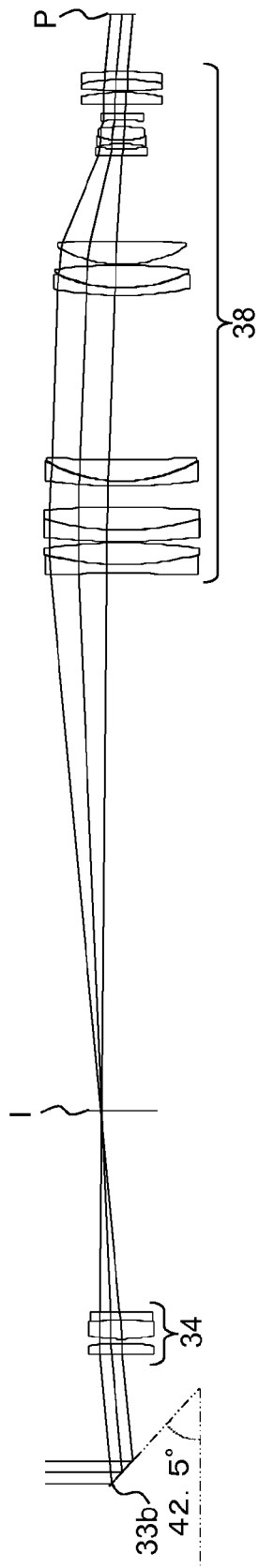

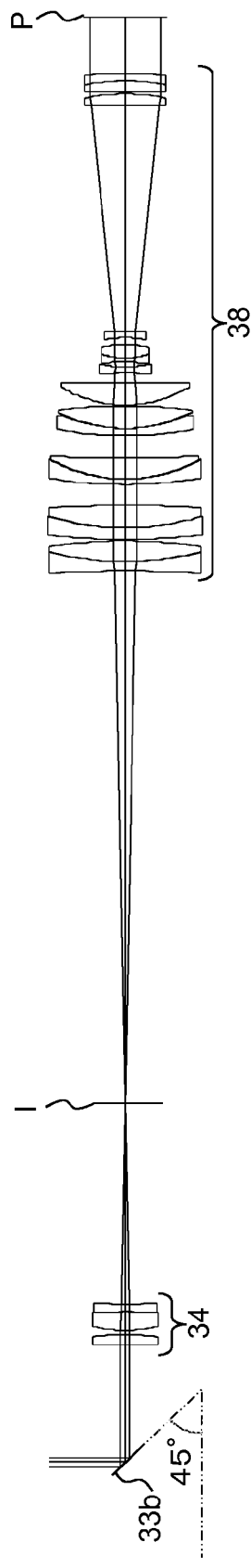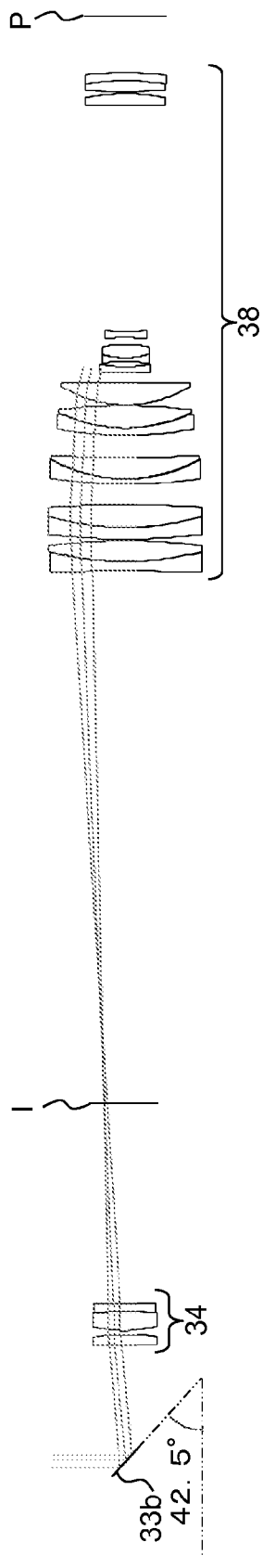
Fig. 12A ON-AXIS LIGHT FLUX
Fig. 12B OFF-AXIS LIGHT FLUX

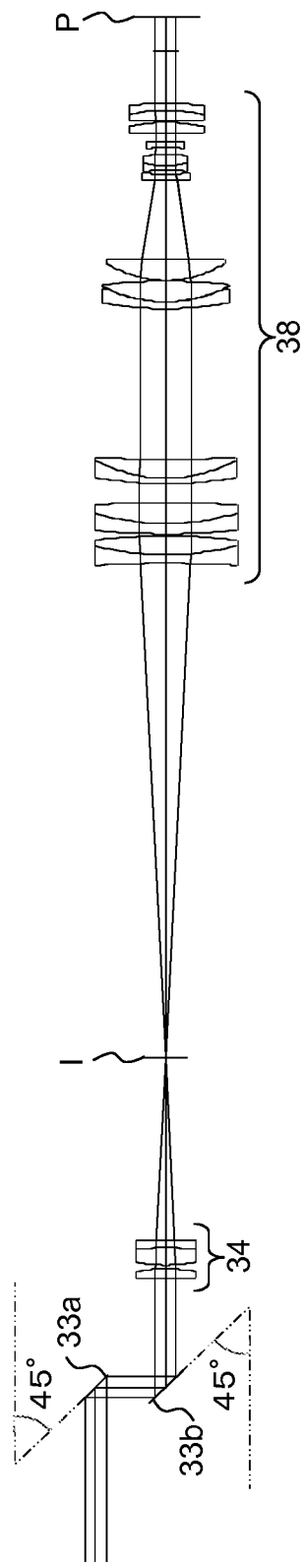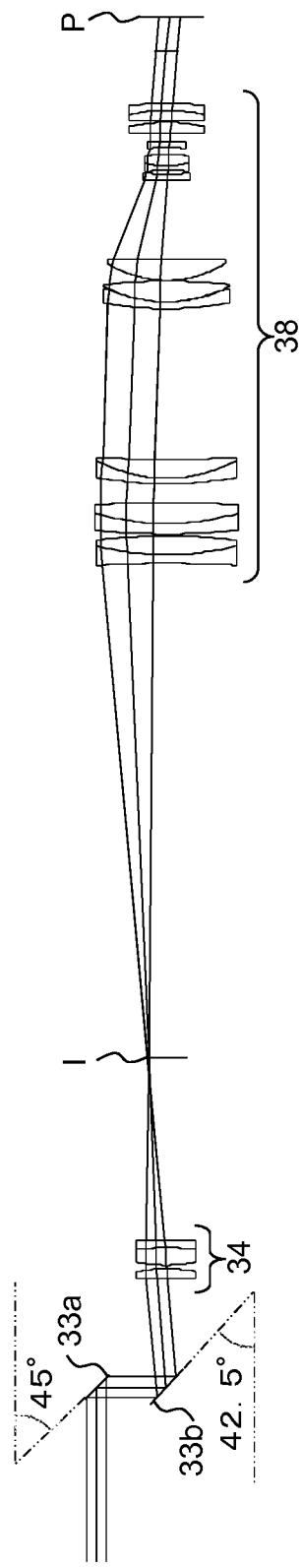
Fig. 13A ON-AXIS LIGHT FLUX
Fig. 13B OFF-AXIS LIGHT FLUX

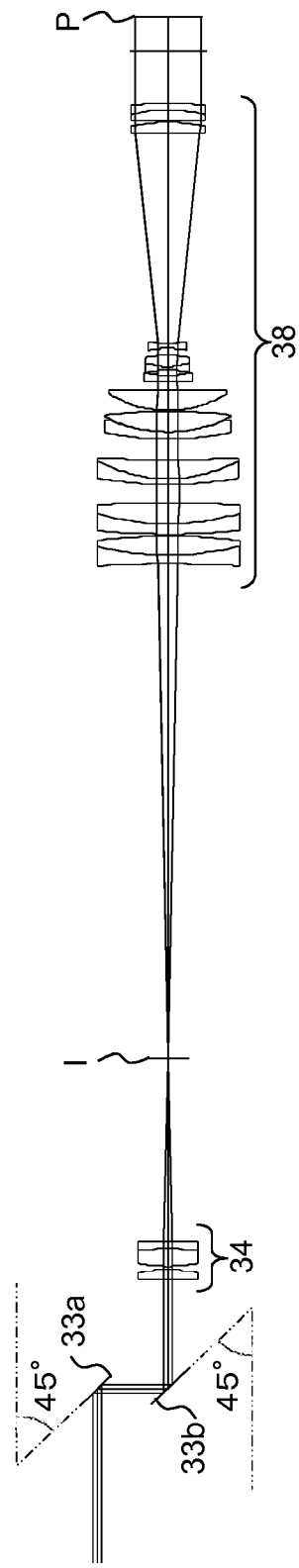
Fig 14A ON-AXIS LIGHT FLUX
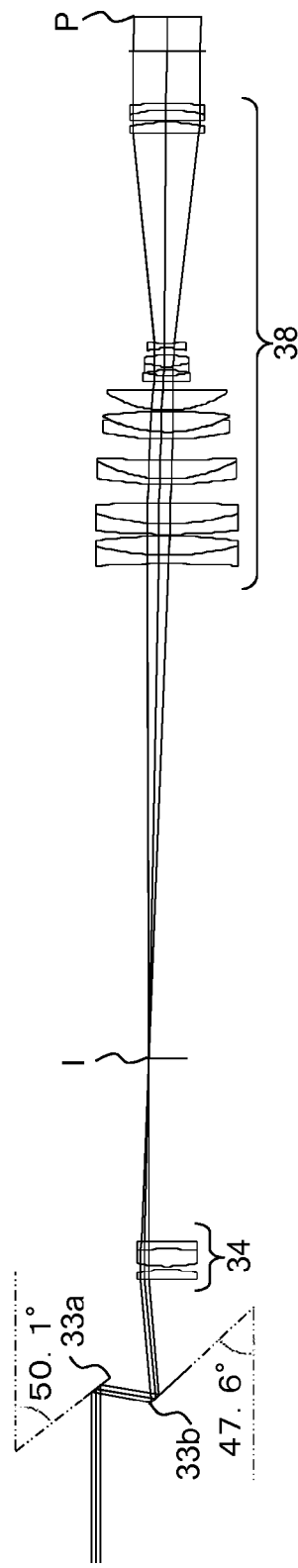
Fig. 14B OFF-AXIS LIGHT FLUX

Fig. 15A INITIAL STATE
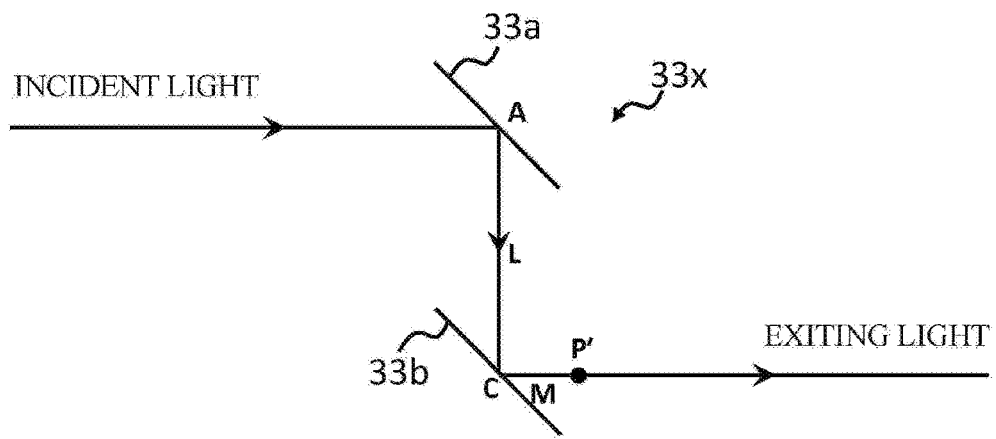
Fig. 15B PIVOTED STATE
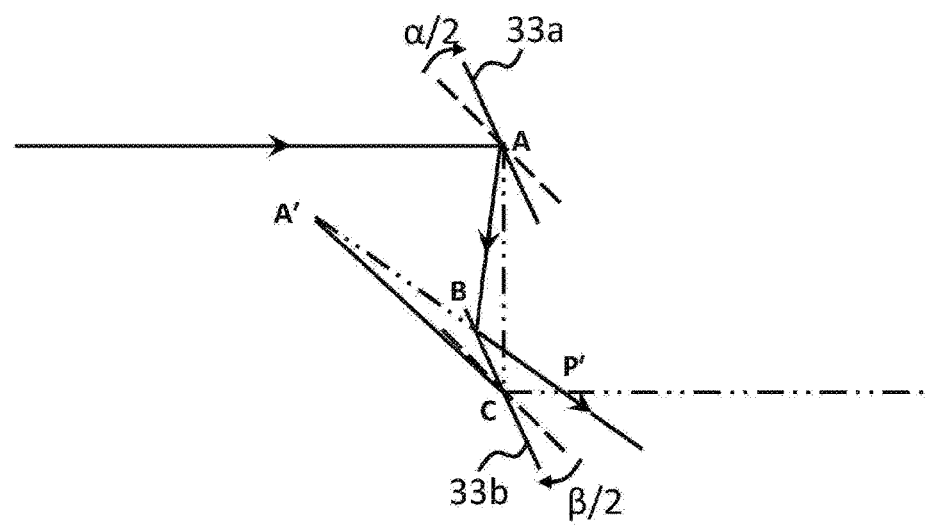

SCANNING MICROSCOPE

CROSS-REFERENCE TO RELATED APPLICATIONS

This application is a continuation of and claims the benefit of International Application No. PCT/JP2012/058321, filed Mar. 29, 2012, and claims the benefit of Japanese Application No. 2011-077527, filed Mar. 31, 2011, the disclosures of both of which are incorporated herein by reference.

TECHNICAL FIELD

The present invention relates to a scanning microscope.

BACKGROUND ART

As is well known, a scanning confocal microscope (hereinafter referred to as scanning microscope) operates as follows: a specimen to be observed is irradiated with a laser beam via an objective lens; light reflected off the specimen under observation irradiated with the laser beam or fluorescence emitted from the specimen under observation excited by the laser beam is focused into a point-like shape via the objective lens again and an optical system; the focused light is detected by a detector and a point image is thus acquired. In this process, a two-dimensional image can be produced by using galvanometric mirrors, which are deflectors, to scan an entire two-dimensional XY plane in the specimen under observation.

FIG. 17 shows a specific path of the laser beam in a scanning microscope of this type. In FIG. 17, a laser beam incident along a direction A passes through a beam splitter 132 and is scanned two-dimensionally by two deflectors 133a and 133b. The laser beam then enters a pupil projection lens 134, passes therethrough, and is focused into a spot on the image plane of an objective lens (not shown). When the two deflectors 133a and 133b are caused to rotate (swing over an angle) to two-dimensionally scan the image plane of the objective lens, reflected light or fluorescence from a specimen that coincides with the image plane travels back along the same path described above, returns to the beam splitter 132, is reflected off the beam splitter 132, further passes through a detection optical system, is incident on a photodetector (not shown) formed, for example, of a photomultiplier, is converted by the photodetector into an electric signal, and allows the pixels of a monitor (not shown) to display a two-dimensional image in correspondence with the XY scan positions of the two deflectors 133a and 133b described above.

In a scanning microscope of this type, to produce a two-dimensional, unevenness-free image based on two-dimensional scanning of the laser beam, the center of the exit pupil of the objective lens always needs to coincide with the rotation center of the laser beam that passes through the objective lens irrespective of the rotation angle (swing angle) of the two deflectors. To this end, the rotation center of each of the deflectors only needs to be conjugate to the position of the exit pupil of the objective lens. Using the two deflectors to two-dimensionally scan the laser beam, however, prevents both the two deflectors from being always conjugate to the position of the exit pupil of the objective lens. To address the problem, in Patent Literature 1, a scanning microscope includes a first deflector that deflects a light flux along one direction, a second deflector that further deflects the light flux having been deflected off the first deflector in the same direction, and a driver that causes the first and second deflectors to rotate with the orientations of the deflectors in synchronization with each other, and the first and second deflectors are disposed so that the position of the center of deflection resulting from the motion of the light flux deflected by the second deflector is located in a position between the first and second deflectors and coincides with a position conjugate to the position of the exit pupil of the objective lens.

The exit pupil of an objective lens, which is theoretically an image-side focal position of the objective lens, is a concept also including a position determined in consideration of important items necessary for those skilled in the art to design the objective lens, such as aberrations and vignetting of the objective lens.

CITATION LIST

Patent Literature

[Patent Literature 1]
  Japanese Patent Laid-Open No. 2001-091848

SUMMARY OF INVENTION

Technical Problem

However, the position of the exit pupil of an imaging optical system formed of an objective lens and a second objective lens or a position conjugate to the exit pupil (exit pupil conjugate position) is not always located in a fixed position. When the exit pupil position changes depending on the type of the objective lens or when the imaging optical system includes a magnification changing optical system, the exit pupil position and the exit pupil conjugate position change.

The present invention has been made in view of the problem described above, and an object of the present invention is to provide a scanning microscope so configured that when the position of the exit pupil of an imaging optical system and a position conjugate to the exit pupil change, the position of the rotation center of a scanned light flux is moved and follows the changed exit pupil position.

Solution to Problem

To solve the problem described above, a scanning microscope according to the present invention includes an objective lens that collects illumination light from a light source and irradiates a specimen with the illumination light and a scan unit that is disposed between the light source and the objective lens and scans the specimen with the illumination light. The scan unit two-dimensionally scans the illumination light over the specimen and includes a first deflector and a second deflector that scan the illumination light in a first direction in the two-dimensional scanning. The deflection angle of the illumination light deflected off each of the first deflector and the second deflector is controlled so that the pivotal point of the illumination light deflected off each of the first deflector and the second deflector substantially coincides with an exit pupil of the objective lens or a position conjugate to the exit pupil. Each of the first deflector and the second deflector has a reflection surface that rotates around an axis of the rotation substantially perpendicular to the first direction. The first deflector reflects the illumination light, and the second deflector further reflects the illumination light reflected off the first deflector. The first deflector and the second deflector are controlled so that the amount of change from a predetermined state of the deflection angle of the illumination light deflected off each of the first deflector and the second deflector is controlled to satisfy the following conditional expression. The deflection angle is an angle with respect to a predetermined reference, and examples of the predetermined reference include the optical axis of an optical system including the objective lens, a reflection surface of any of the deflectors, and a normal to the reflection surface of any of the deflectors.

$$\beta = \operatorname{atan}\left(\frac{L\tan\alpha \pm \tan\alpha\sqrt{M^2(\tan^2\alpha + 1)^2 - L^2\tan^2\alpha}}{-L\tan\alpha \pm \sqrt{M^2(\tan^2\alpha + 1)^2 - L^2\tan^2\alpha}}\right)$$

Where $\alpha$ represents the amount of change from the predetermined state of the deflection angle of the illumination light deflected off the first deflector, $\beta$ represents the amount of change from the predetermined state of the deflection angle of the illumination light deflected off the second deflector, L represents the distance between the rotation center of the first deflector and the rotation center of the second deflector, and M represents the distance between the rotation center of the second deflector and the pivotal point of the illumination light deflected off each of the first deflector and the second deflector.

Further, in the scanning microscope described above, it is preferable that the scan unit further includes a third deflector and a fourth deflector that scan the illumination light in a second direction perpendicular to the first direction, that the deflection angle of the illumination light deflected off each of the third deflector and the fourth deflector is controlled so that the pivotal point of the illumination light deflected off each of the third deflector and the fourth deflector substantially coincides with the exit pupil of the objective lens or the position conjugate to the exit pupil, that each of the third deflector and the fourth deflector has a reflection surface that rotates around an axis of the rotation substantially perpendicular to the second direction, that the third deflector reflects the illumination light and the fourth deflector further reflects the illumination light reflected off the third deflector, and that the third deflector and the fourth deflector are controlled so that the amount of change from a predetermined state of the deflection angle of the illumination light deflected off each of the third deflector and the fourth deflector is controlled to satisfy the following conditional expression:

$$\beta = \operatorname{atan}\left(\frac{L\tan\alpha \pm \tan\alpha\sqrt{M^2(\tan^2\alpha + 1)^2 - L^2\tan^2\alpha}}{-L\tan\alpha \pm \sqrt{M^2(\tan^2\alpha + 1)^2 - L^2\tan^2\alpha}}\right)$$

where $\alpha$ represents the amount of change from the predetermined state of the deflection angle of the illumination light deflected off the third deflector, $\beta$ represents the amount of change from the predetermined state of the deflection angle of the illumination light deflected off the fourth deflector, L represents the distance between the rotation center of the third deflector and the rotation center of the fourth deflector, and M represents the distance between the rotation center of the fourth deflector and the pivotal point of the illumination light deflected off each of the third deflector and the fourth deflector.

In the scanning microscope described above, the first deflector and the second deflector are preferably so disposed that the incidence angle of the illumination light incident on the reflection surface of each of the first deflector and the second deflector is smaller than 45° when the illumination light travels along the optical axis of the objective lens.

In the scanning microscope described above, the third deflector and the fourth deflector are preferably disposed so that the incidence angle of the illumination light incident on the reflection surface of each of the third deflector and the fourth deflector is smaller than 45° when the illumination light travels along the optical axis of the objective lens.

In the scanning microscope described above, the first deflector and the second deflector are preferably disposed so that the illumination light incident on the reflection surface of the first deflector intersects the illumination light reflected off the reflection surface of the second deflector.

In the case described above, the first deflector and the second deflector are preferably disposed so that the illumination light incident on the reflection surface of the first deflector is substantially perpendicular to the illumination light reflected off the reflection surface of the second deflector.

In the scanning microscope described above, the third deflector and the fourth deflector are preferably disposed so that the illumination light incident on the reflection surface of the third deflector intersects the illumination light reflected off the reflection surface of the fourth deflector.

In the case described above, the third deflector and the fourth deflector are preferably disposed so that the illumination light incident on the reflection surface of the third deflector is substantially perpendicular to the illumination light reflected off the reflection surface of the fourth deflector.

Further, a scanning microscope according to the present invention includes an objective lens that collects illumination light from a light source and irradiates a specimen with the illumination light and a scan unit that is disposed between the light source and the objective lens and scans the specimen with the illumination light. The scan unit includes a first deflector and a second deflector that scan the illumination light in a first direction in the specimen and a third deflector and a fourth deflector that scan the illumination light in a second direction perpendicular to the first direction. The deflection angle of the illumination light deflected off each of the first deflector, the second deflector, the third deflector, and the fourth deflector is controlled so that the pivotal point of the illumination light deflected off each of the first deflector and the second deflector and the pivotal point of the illumination light deflected off each of the third deflector and the fourth deflector substantially coincide with an exit pupil of the objective lens or a position conjugate to the exit pupil.

The scanning microscope described above preferably includes a magnification changing optical system that changes the magnification of the scanning microscope so that an image of the specimen magnified accordingly is formed and moves the position conjugate to the exit pupil of the objective lens in accordance with the change in magnification, and the deflection angle of the illumination light deflected off each of the first deflector, the second deflector, the third deflector, and the fourth deflector is so controlled in accordance with the movement of the position conjugate to the exit pupil of the objective lens that the pivotal point of the illumination light deflected off each of the first deflector and the second deflector and the pivotal point of the illumination light deflected off each of the third deflector and the fourth deflector substantially coincide with a position conjugate to the moved exit pupil.

In the scanning microscope described above, it is preferably that the first deflector and the second deflector are disposed so that the pivotal point of the illumination light deflected off each of the first deflector and the second deflector is located in a position between a predetermined position away from the first deflector toward the light source side and a predetermined position away from the second deflector toward the specimen side, and that the third deflector and the fourth deflector are disposed so that the pivotal point of the illumination light deflected off each of the third deflector and the fourth deflector is located in a position between a predetermined position away from the third deflector toward the light source side and a predetermined position away from the fourth deflector toward the specimen side.

In the scanning microscope described above, it is preferable that each of the first deflector and the second deflector has a reflection surface that rotates around an axis of the rotation substantially perpendicular to the first direction, that each of the third deflector and the fourth deflector has a reflection surface that rotates around an axis of the rotation substantially perpendicular to the second direction, that the first deflector reflects the illumination light incident from the light source and the second deflector further reflects the illumination light reflected off the first deflector, and that the third deflector reflects the illumination light and the fourth deflector further reflects the illumination light reflected off the third deflector.

In the scanning microscope described above, the first and second deflectors and the third and fourth deflectors are preferably controlled so that the amount of change from a predetermined state of the deflection angle of the illumination light deflected off each of the first deflector and the second deflector and the amount of change from a predetermined state of the deflection angle of the illumination light deflected off each of the third deflector and the fourth deflector are controlled to satisfy the following conditional expression:

$$\beta = \mathrm{atan}\left(\frac{L\tan\alpha \pm \tan\alpha\sqrt{M^2(1+\tan^2\alpha) - L^2\tan^2\alpha}}{-L\tan^2\alpha \pm \sqrt{M^2(1+\tan^2\alpha) - L^2\tan^2\alpha}}\right)$$

where α represents the amount of change from the predetermined state of the deflection angle of the illumination light deflected off the first deflector or the third deflector, β represents the amount of change from the predetermined state of the deflection angle of the illumination light deflected off the second deflector or the fourth deflector, L represents the distance between the rotation center of the first deflector and the rotation center of the second deflector or the distance between the rotation center of the third deflector and the rotation center of the fourth deflector, and M represents the distance between the rotation center of the second deflector and the pivotal point of the illumination light deflected off the each of first deflector and the second deflector or the distance between the rotation center of the fourth deflector and the pivotal point of the illumination light deflected off each of the third deflector and the fourth deflector.

In the scanning microscope described above, the first deflector and the second deflector are preferably disposed so that the incidence angle of the illumination light incident on the reflection surface of each of the first deflector and the second deflector is smaller than 45° when the illumination light travels along the optical axis of the objective lens.

In the scanning microscope described above, the third deflector and the fourth deflector are preferably disposed so that the incidence angle of the illumination light incident on the reflection surface of each of the third deflector and the fourth deflector is smaller than 45° when the illumination light travels along the optical axis of the objective lens.

In the scanning microscope described above, the first deflector and the second deflector are preferably disposed so that the illumination light incident on the reflection surface of the first deflector intersects the illumination light reflected from the reflection surface of the second deflector.

In the case described above, the first deflector and the second deflector are preferably disposed so that the illumination light incident on the reflection surface of the first deflector is substantially perpendicular to the illumination light reflected off the reflection surface of the second deflector.

In the scanning microscope described above, the third deflector and the fourth deflector are preferably disposed so that the illumination light incident on the reflection surface of the third deflector intersects the illumination light reflected off the reflection surface of the fourth deflector.

In the case described above, the third deflector and the fourth deflector are preferably disposed so that the illumination light incident on the reflection surface of the third deflector is substantially perpendicular to the illumination light reflected off the reflection surface of the fourth deflector.

Advantageous Effect of Invention

In the scanning microscope according to the present invention configured as described above, when the position of the exit pupil of an imaging optical system and a position conjugate to the exit pupil change, the position of the rotation center of a scanned light flux is moved and follows the changed exit pupil position or exit pupil conjugate position.

BRIEF DESCRIPTION OF DRAWINGS

FIG. 4 (which includes FIGS. 4A, 4B, 4C and 4D) is a descriptive diagram showing rays that scan the specimen with the rotation center produced by the first and second deflectors located on the light source side, FIG. 4A showing the trajectories of scanned rays, FIG. 4B showing an upper ray in FIG. 4A, FIG. 4C showing a ray along the optical axis in FIG. 4A, and FIG. 4D showing a lower ray in FIG. 4A.

FIG. 5 (which includes FIGS. 5A, 5B, 5C and 5D) is a descriptive diagram showing rays that scan the specimen with the rotation center produced by the first and second deflectors located on the rotation center of the second deflector, FIG. 5A showing the trajectories of scanned rays, FIG. 5B showing an upper ray in FIG. 5A, FIG. 5C showing a ray along the optical axis in FIG. 5A, and FIG. 5D showing a lower ray in FIG. 5A.

FIG. 6 (which includes FIGS. 6A, 6B, 6C and 6D) is a descriptive diagram showing rays that scan the specimen with the rotation center produced by the first and second deflectors located in a position substantially middle between the first deflector and the second deflector, FIG. 6A showing the trajectories of scanned rays, FIG. 6B showing an upper ray in FIG. 6A, FIG. 6C showing a ray along the optical axis in FIG. 6A, and FIG. 6D showing a lower ray in FIG. 6A.

FIG. 7 (which includes FIGS. 7A, 7B, 7C and 7D) is a descriptive diagram showing rays that scan the specimen with the rotation center produced by the first and second deflectors located on the rotation center of the first deflector, FIG. 7A showing the trajectories of scanned rays, FIG. 7B showing an upper ray in FIG. 7A, FIG. 7C showing a ray along the optical axis in FIG. 7A, and FIG. 7D showing a lower ray in FIG. 7A.

FIG. 8 (which includes FIGS. 8A and 8B) is a descriptive diagram for comparing the configurations of the scan unit according to the present embodiment, FIG. 8A showing the scan unit according to the first embodiment and FIG. 8B showing the configuration of a scan unit according to a second embodiment.

FIG. 9 (which includes FIGS. 9A and 9B) is a descriptive diagram for describing the arrangement of the deflectors in the scan unit, FIG. 9A showing a conventional scanning microscope and FIG. 9B showing a scanning microscope according to the second embodiment.

FIG. 10 (which includes FIGS. 10A and 10B) is a descriptive diagram showing the configuration of a scan optical system in which the position of the exit pupil changes, FIG. 10A showing a case where the focal length of a magnification changing second objective optical system that forms the scan optical system is 60 mm and FIG. 10B showing a case where the focal length of the magnification changing second objective optical system is 450 mm.

FIG. 11 (which includes FIGS. 11A and 11B) is a descriptive diagram showing a state in which the focal length of the magnification changing second objective optical system is 60 mm and the second deflector is disposed in an exit pupil conjugate position, FIG. 11A showing the state of an on-axis light flux and FIG. 11B showing the state of an off-axis light flux.

FIG. 12 (which includes FIGS. 12A and 12B) is a descriptive diagram showing a state in which the focal length of the magnification changing second objective optical system is changed from the state in FIG. 11 to 450 mm, FIG. 12A showing the state of an on-axis light flux and FIG. 12B showing the state of an off-axis light flux.

FIG. 13 (which includes FIGS. 13A and 13B) is a descriptive diagram showing a state in which the focal length of the magnification changing second objective optical system is 60 mm, the second deflector is disposed in an exit pupil conjugate position, and the first deflector is disposed in a position toward the image side from the second deflector, FIG. 13A showing the state of an on-axis light flux and FIG. 13B showing the state of an off-axis light flux.

FIG. 14 (which includes FIGS. 14A and 14B) is a descriptive diagram showing a state in which the focal length of the magnification changing second objective optical system is changed from the state in FIG. 13 to 450 mm, FIG. 14A showing the state of an on-axis light flux and FIG. 14B showing the state of an off-axis light flux.

FIG. 15 (which includes FIGS. 15A and 15B) is a descriptive diagram showing the relationship between the rotation angle of each of the first and second deflectors and the deflection angle of illumination light deflected off the deflectors, FIG. 15A showing an initial state and FIG. 15B showing a state in which the first and second deflectors are caused to rotate.

DESCRIPTION OF EMBODIMENTS

Figure 1:
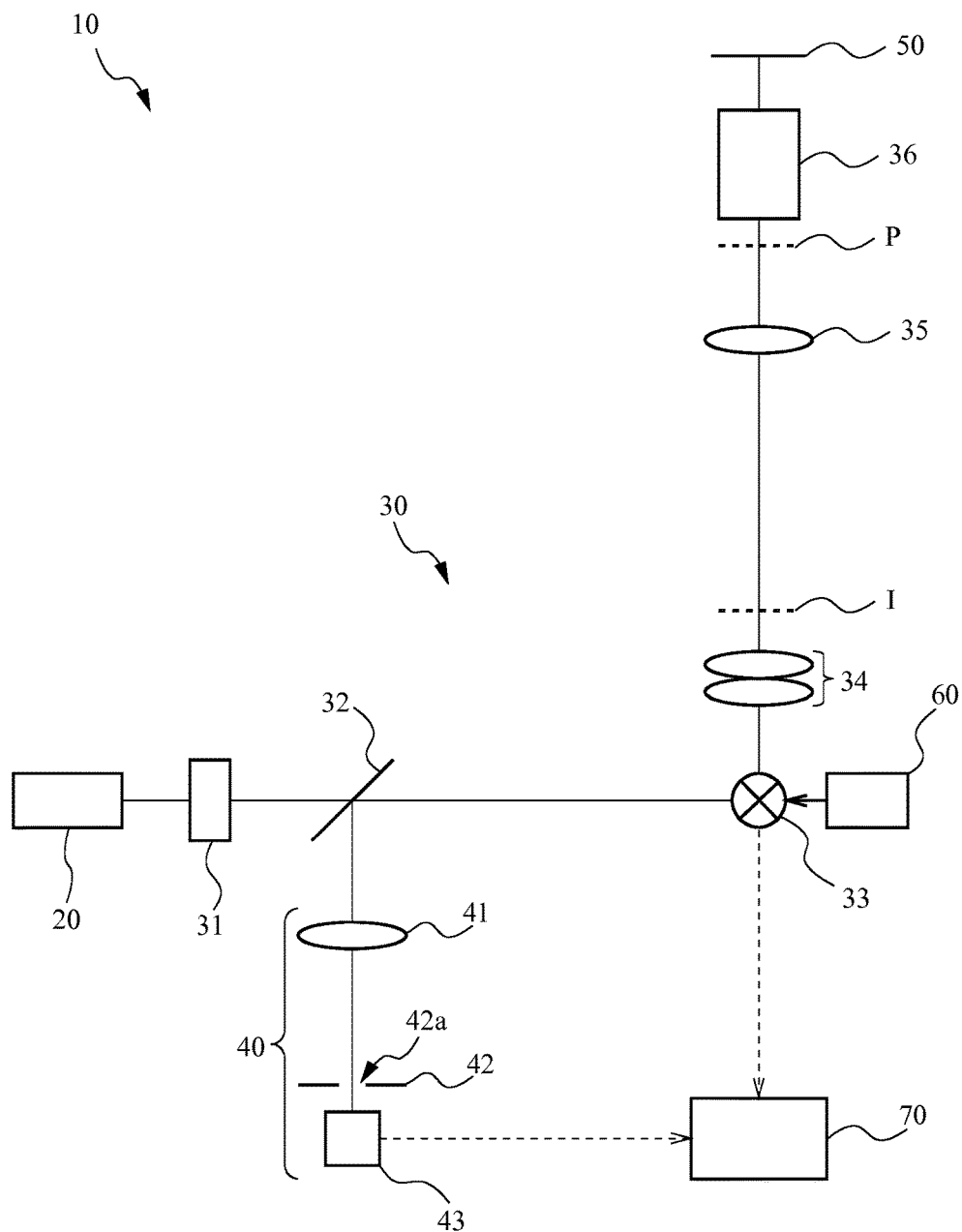
FIG. 1 is a descriptive diagram showing the configuration of a scanning microscope according to the present embodiment.

A preferable embodiment of the present invention will be described below with reference to the drawings. A description will first be made of the configuration of a scanning microscope according to the present embodiment with reference to FIG. 1. A scanning microscope 10 includes a scan optical system 30, which irradiates a specimen 50 of a specimen to be observed with a laser beam (illumination light) emitted from a light source 20 and scans the specimen 50 with the laser beam, and a detection optical system 40, which detects reflected light or fluorescence from the specimen 50.

The scan optical system 30 includes a beam expander 31, a beam splitter 32, a scan unit 33, a pupil projection lens 34, a second objective lens 35, and an objective lens 36 sequentially arranged from the side where the light source 20 is present. The detection optical system 40 branches sideways from the scan optical system 30 and includes an imaging lens 41, a light blocking plate 42, and a photodetector 43 sequentially arranged from the side where the beam splitter 32 is present. The scanning microscope 10 is further provided with a processor 70, which processes the positions where the scan unit 33 performs the scanning (coordinates in specimen 50) and values detected by the photodetector 43.

Figure 2:
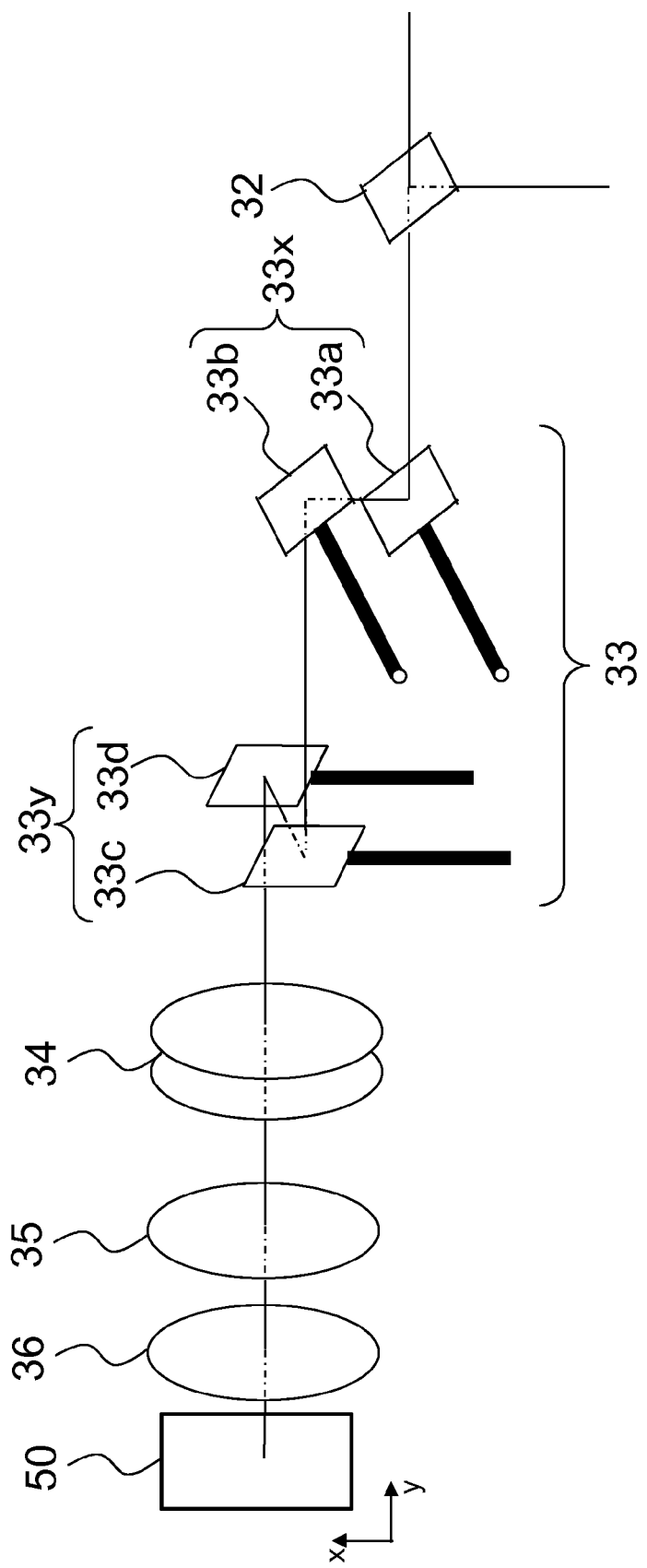
FIG. 2 is a descriptive diagram showing the configuration of a scan unit according to a first embodiment.

In the scanning microscope 10, the laser beam emitted from the light source 20 is converted by the beam expander 31 into a substantially collimated light flux having a necessary beam diameter, passes through the beam splitter 32, and enters the scan unit 33. The scan unit 33, as will be described later, two-dimensionally scans the laser beam in directions perpendicular to the optical axis and includes four deflectors formed, for example, of a first deflector 33a, a second deflector 33b, a third deflector 33c, and a fourth deflector 33d, each of which reflects and deflects the laser beam as shown in FIG. 2. The first to fourth deflectors 33a to 33d are caused to rotate (swing) by motors in a driver 60. The laser beam (substantially collimated light flux) having exited out of the scan unit 33 is focused by the pupil projection lens 34 onto a primary image plane I, then converted into a substantially collimated light flux again when it passes through the second objective lens 35, and focused by the objective lens 36 onto the specimen (focal plane of objective lens 36) 50.

The image of the laser beam focused on the specimen 50 is a point image, and the diameter of the point image has a size determined by the numerical aperture (NA) of the objective lens 36. The reflected light or fluorescence from the point image (irradiated area) in the specimen 50 is collected by the objective lens 36 again into a substantially collimated light flux, which is focused by the second objective lens 35 onto the primary image plane I and then further converted by the pupil projection lens 34 into a substantially collimated light flux, which is incident on the scan unit 33. The reflected light or fluorescence (substantially collimated light flux) is descanned by the scan unit 33, exits out of the scan unit 33, is reflected off the beam splitter 32, enters the detection optical system 40, and is collected by the imaging lens 41 into an opening 42a of the light blocking plate 42. Only the light having passed through the opening 42a of the light blocking plate 42 reaches the photodetector 43 and is detected by the photodetector 43.

As described above, the opening 42a of the light blocking plate 42 is conjugate to the point image of the laser beam focused on the specimen 50, and the light having exited from the irradiated area of the specimen 50 (reflected light or fluorescence) can therefore pass through the opening 42a. On the other hand, most of the light having exited from the other areas of the specimen 50 is not focused into the opening 42a or cannot pass therethrough. In the configuration described above, the processor 70, which processes an optical signal detected by the photodetector 43 in synchronization with the scanning performed by the scan unit 33, can produce a two-dimensional image of the specimen 50 by using the coordinates where the specimen 50 is irradiated with the laser beam and the luminance obtained from the optical signal. The scanning microscope 10 can thus produce a high-resolution image of the specimen 50.

In the thus configured scanning microscope 10, to produce a two-dimensional, unevenness-free image based on the two-dimensional scanning of the laser beam, the rotation center of the laser beam deflected off the first to fourth deflectors 33a to 33d, which form the scan unit 33, (center of swing angle of the laser beam swung to scan specimen 50), needs to be conjugate to the position of the exit pupil P of the objective lens (imaging optical system) 36, as described above. To this end, the pupil projection lens 34 is configured so that it forms an image of the exit pupil P of the objective lens 36 in the scan unit 33 or in the vicinity thereof. The configuration of the scan unit 33 will be described below.

[First Embodiment]

Figures 3A, 3B, 3C, 3D:
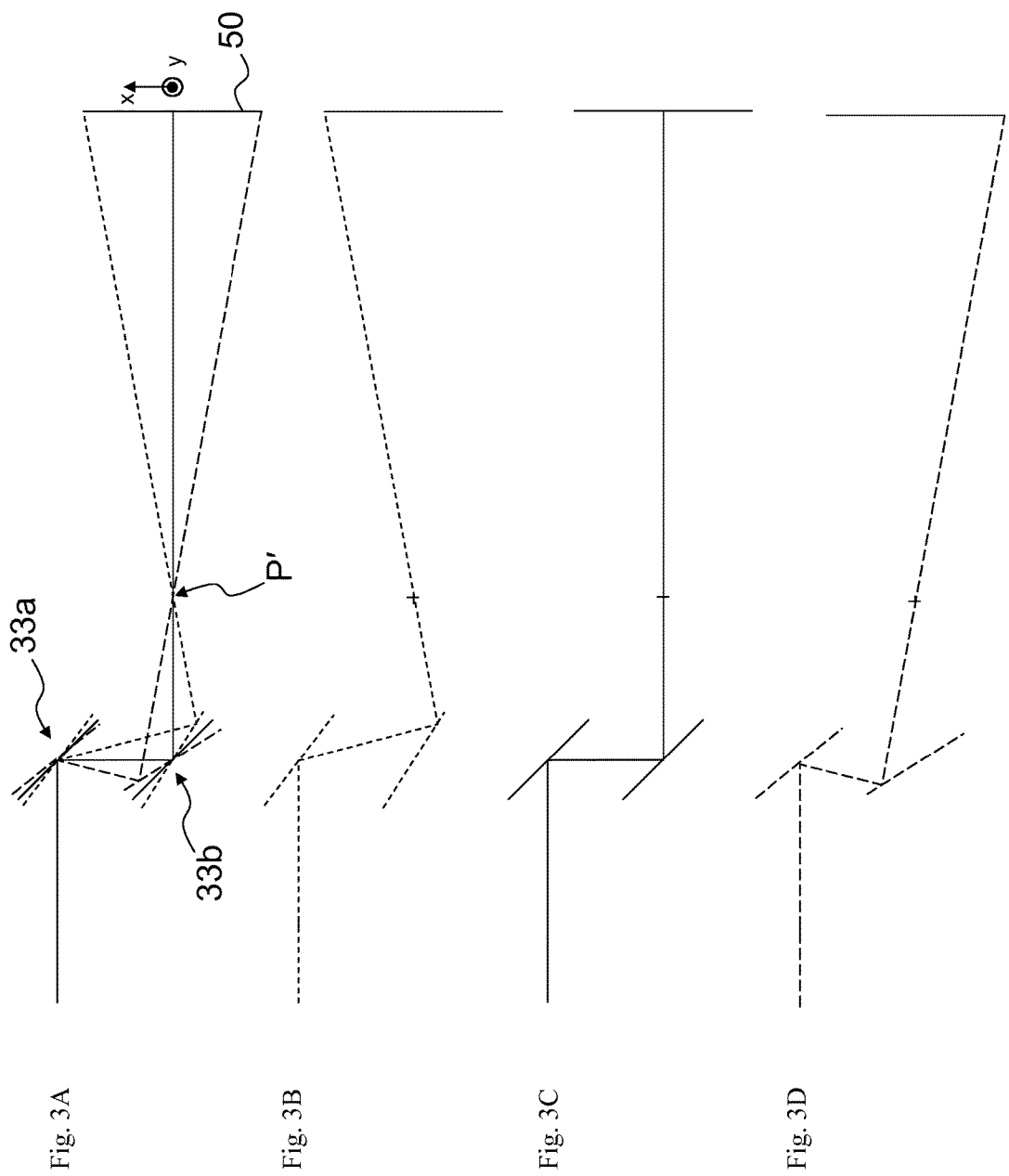
FIG. 3 (which includes FIGS. 3A, 3B, 3C and 3D) is a descriptive diagram showing rays that scan a specimen with the rotation center produced by first and second deflectors located on the specimen side, FIG. 3A showing the trajectories of scanned rays, FIG. 3B showing an upper ray in FIG. 3A, FIG. 3C showing a ray along the optical axis in FIG. 3A, and FIG. 3D showing a lower ray in FIG. 3A.

FIG. 2 described above shows the configuration of the scan unit 33 according to a first embodiment. It is assumed as shown in FIG. 2 that an x-axis direction is a predetermined direction (upward/downward direction in FIG. 2) in the specimen 50 perpendicular to the optical axis, and that a y-axis direction is a direction perpendicular to the x-axis direction (rightward/leftward direction in FIG. 2). The scan unit 33 includes two deflectors that scan the point image of the laser beam in the x-axis direction in the specimen 50 (first and second deflectors 33a, 33b) and two deflectors that scan the point image of the laser beam in the y-axis direction in the specimen 50 (third and fourth deflectors 33c, 33d). In the configuration shown in FIG. 2, each of the first and second deflectors 33a, 33b has a scan axis of rotation extending in the y-axis direction, and each of the third and fourth deflectors 33c, 33d has a scan axis of rotation extending in the x-axis direction. When the scan axes are caused to rotate by the motors in the driver 60 described above, reflection surfaces of the first and second deflectors 33a, 33b rotate (swing) in the x-axis direction, and reflection surfaces of the third and fourth deflectors 33c, 33d rotate (swing) in the y-axis direction. When an area on the optical axis in the x-axis direction of the specimen 50 is irradiated with the laser beam having exited out of the scan unit 33, the reflection surfaces of the first and second deflectors 33a, 33b are substantially parallel to each other and inclined to the optical axis by 45° (incidence angle of laser beam incident on reflection surfaces is) 45°, as shown in FIG. 3C. The same holds true for the third and fourth deflectors 33c, 33d responsible for the y-axis direction. A description will next be made of the first and second deflectors 33a, 33b, which scan the laser beam in the x-axis direction, and it is noted that the third and fourth deflectors 33c, 33d, which scan the laser beam in the y-axis direction, have the same configuration.

In the present embodiment, a case where the position of the exit pupil of the imaging optical system formed of the objective lens 36 and the second objective lens 35 (position of exit pupil of objective lens 36) changes is, for example, assumed to be a case where a plurality of objective lenses 36 having different exit pupil positions are used or a case where the imaging optical system includes a magnification changing optical system (is formed of objective lens, magnification changing optical system and second objective lens) and the exit pupil conjugate position changes with magnification. In this case, even when the rotation centers of the two-dimensionally scanned light flux coincide with each other, but when the position of the rotation centers is not conjugate to the exit pupil or does not coincide with the exit pupil conjugate position, loss in the amount of light and degradation in optical performance occur in the on-axis and off-axis areas in both the dimensions. To avoid the loss and degradation, the rotation centers are moved in accordance with the change in the exit pupil position or the exit pupil conjugate position.

FIGS. 3 to 7 show cases where the first and second deflectors 33a, 33b scan the laser light incident along the optical axis in the x-axis direction in the specimen 50 (hereinafter referred to as "one-dimensional scan"). In this case, the scan axes of rotation of the first and second deflectors 33a, 33b extend substantially in parallel to each other in the y-axis direction. FIG. 3 shows a case where the laser beam is scanned with a point P', which is located in a position away from the second deflector 33b toward the specimen 50, being the rotation center by adjusting the rotation angles (swing angles) of the first and second deflectors 33a, 33b. FIG. 4 shows a case where rotation angles (rotation swing angles) of the first and second deflectors 33a, 33b are so controlled that the rotation center P' of the laser beam scanned by the first and second deflectors 33a, 33b is located in a position away from the first deflector 33a toward the light source 20. FIG. 5 shows a case where rotation angles (rotation swing angles) of the first and second deflectors 33a, 33b are controlled so that the rotation center P' of the laser beam scanned by the first and second deflectors 33a, 33b coincides with the rotation center of the second deflector 33b. In this case, the first deflector 33a does not rotate. FIG. 6 shows a case where rotation angles (rotation swing angles) of the first and second deflectors 33a, 33b are controlled so that the rotation center P' of the laser beam scanned by the first and second deflectors 33a, 33b is located in a substantially middle position between the first deflector 33a and the second deflector 33b. In this case, since the first deflector 33a and the second deflector 33b are symmetrically positioned with each other, the rotation swing angles thereof are substantially equal to each other. FIG. 7 shows a case where rotation angles (rotation swing angles) of the first and second deflectors 33a, 33b are controlled so that the rotation center P' of the laser beam scanned by the first and second deflectors 33a, 33b coincides with the rotation center of the first deflector 33a. In this case, the second deflector 33b does not rotate.

As described above, controlling the rotation angles (rotation swing angles) of the first and second deflectors 33a, 33b allows the rotation center P', around which the specimen 50 is scanned with the laser beam in the x-axis direction, to be moved over the range from the image side of the first deflector 33a to the object side of the second deflector 33b. That is, it has been shown that the following five types of one-dimensional scan optical system in total are achieved by the same configuration described above including the two deflectors 33a and 33b:

I. The case where the rotation center P' in one-dimensional scanning is located in a position away from the first deflector 33a toward the light incident side (the case shown in FIG. 4);

II. The case where the rotation center P' in one-dimensional scanning coincides with the rotation center of the first deflector 33a (the case shown in FIG. 7);

III. The case where the rotation center P' in one-dimensional scanning is located in a position between the first deflector 33a and the second deflector 33b (the case shown in FIG. 6);

IV. The case where the rotation center P' in one-dimensional scanning coincides with the rotation center of the second deflector 33b (the case shown in FIG. 5); and V. The case where the rotation center P' in one-dimensional scanning is located in a position away from the second deflector 33b toward the light exiting side (case shown in FIG. 3).

The third and fourth deflectors 33c, 33d can be configured in the same manner.

In the scanning microscope 10 including the two-dimensional scan optical system (scan unit 33) including a first one-dimensional scan optical system formed of the first and second deflectors 33a, 33b (hereinafter referred to as X-scan optical system 33x) and a second one-dimensional scan optical system formed of the third and fourth deflectors 33c, 33d (hereinafter referred to as Y-scan optical system 33y) sequentially arranged from the side where the light source 20 is present (in the order of incidence of laser beam) as shown in FIG. 2, when the exit pupil conjugate position in the imaging optical system is located in a position away from the first deflector 33a in the X-scan optical system 33x toward the light incident side, each of the X-scan optical system 33x and the Y-scan optical system 33y needs to be a one-dimensional scan optical system of the type I. When the exit pupil conjugate position in the imaging optical system coincides with the rotation center of the first deflector 33a in the X-scan optical system 33x, the X-scan optical system 33x is a one-dimensional scan optical system of the type II, and the Y-scan optical system 33y is a one-dimensional scan optical system of the type I. When the exit pupil conjugate position in the imaging optical system is located in a position between the first deflector 33a and the second deflector 33b in the X-scan optical system 33x, the X-scan optical system is a one-dimensional scan optical system of the type III, and the Y-scan optical system 33y is a one-dimensional scan optical system of the type I. When the exit pupil conjugate position in the imaging optical system coincides with the rotation center of the second deflector 33b in the X-scan optical system 33x, the X-scan optical system 33x is a one-dimensional scan optical system of the type IV, and the Y-scan optical system 33y is a one-dimensional scan optical system of the type I. When the exit pupil conjugate position in the imaging optical system is located in a position away from the second deflector 33b in the X-scan optical system 33x toward the light exiting side, the X-scan optical system is a one-dimensional scan optical system of type V, and the Y-scan optical system 33y is a one-dimensional scan optical system of the type I. When the exit pupil conjugate position in the imaging optical system coincides with the rotation center of the third deflector 33c in the Y-scan optical system 33y, the X-scan optical system 33x is a one-dimensional scan optical system of the type V, and the Y-scan optical system 33y is a one-dimensional scan optical system of the type II. When the exit pupil conjugate position in the imaging optical system is located in a position between the third deflector 33c and the fourth deflector 33d in the Y-scan optical system 33y, the X-scan optical system 33x is a one-dimensional scan optical system of the type V, and the Y-scan optical system 33y is a one-dimensional scan optical system of the type III. When the exit pupil conjugate position in the imaging optical system coincides with the rotation center of the fourth deflector 33d in the Y-scan optical system 33y, the X-scan optical system 33x is a one-dimensional scan optical system of the type V, and the Y-scan optical system 33y is a one-dimensional scan optical system of the type IV. When the exit pupil conjugate position in the imaging optical system is located in a position away from the fourth deflector 33d in the Y-scan optical system 33y toward the light exiting side, each of the X-scan optical system 33x and the Y-scan optical system 33y needs to be a one-dimensional scan optical system of the type V.

As described above, even when the exit pupil conjugate position in the imaging optical system is located in any of the positions described above, the exit pupil conjugate state can be maintained by using the two-dimensional scan optical system (scan unit 33) according to the present embodiment having the same configuration.

Further, each of the deflectors 33a to 33d described above can instead be formed, for example, of a polygonal mirror (rotating multifaceted mirror) or an acousto-optic device. Moreover, the deflectors 33a to 33d can be configured so that the first and second deflectors 33a, 33b scan the specimen 50 in the y-axis direction with the laser light and the third and fourth deflectors 33c, 33d scan the specimen 50 in the x-axis direction with the laser light.

Further, the X-scan optical system 33x and the Y-scan optical system 33y may have a nested structure. Specifically, the first deflector 33a in the X-scan optical system 33x, the third deflector 33c in the Y-scan optical system 33y, the second deflector 33b in the X-scan optical system 33x, and the fourth deflector 33d in the Y-scan optical system 33y may be arranged in this order from the side where the light source 20 is present, or the first deflector 33a in the X-scan optical system 33x, the third deflector 33c in the Y-scan optical system 33y, the fourth deflector 33d in the Y-scan optical system 33y, and the second deflector 33b in the X-scan optical system 33x may be arranged in this order from the side where the light source 20 is present. What is important is that two deflectors are provided for each of the scan directions.

[Second Embodiment]

When the incidence angle of the laser beam incident on the reflection surface of each of the first and second deflectors 33a, 33b is set at 45° in order to cause the laser beam to exit out of the scan unit 33 along the optical axis as shown in the scan unit 33 according to the first embodiment, the fact that the rotation (swing motion) of the first deflector 33a moves the light flux incident on the second deflector 33b in the x-axis direction as shown in FIG. 8A, resulting in an increase in size of the reflection surface of the second deflector 33b. The size of the reflection surface of the second deflector 33b can be reduced by arranging the first and second deflectors 33a, 33b in such a way that the light flux incident on the first deflector 33a intersects the light flux having exited from the second deflector 33b, as shown in FIG. 8B. The reason for this is that the arrangement described above allows the incidence angle of the laser beam incident on each of the first and second deflectors 33a, 33b (incidence angle of laser beam that exits from scan unit 33 along optical axis) to be smaller than 45°, resulting in a decrease in the amount of x-axis direction movement of the light flux incident on the second deflector 33b produced by the rotation of the first deflector 33a. The arrangement described above further reduces the size of the first deflector 33a as compared with the case shown in FIG. 8A. The same holds true for the third and fourth deflectors 33c, 33d.

Further, in the state in which the scan optical system 30 scans the center of the image plane (on optical axis) as shown in FIG. 8A, when the light flux incident on the first deflector 33a is substantially parallel to the light flux having exited from the second deflector 33b, the first deflector 33a and the second deflector 33b are also parallel to each other. In this state, when the distance between the first deflector 33a and the second deflector 33b becomes smaller than a certain value, the second deflector 33b undesirably blocks the incident light flux. On the other hand, in the configuration shown in FIG. 8B, in which the light flux incident on the first deflector 33a intersects the light flux having exited from the second deflector 33b, the overall light flux can be folded, whereby the scan optical system 30 can be further reduced in size.

The following Table 1 shows effective diameters φ1 and φ2 of the reflection surfaces of the first and second deflectors 33a, 33b in the case shown in FIG. 8A, where the incident and exiting light fluxes are parallel to each other, and in the case shown in FIG. 8B, where the incident and exiting light fluxes intersect each other, under the following conditions: The incident beam diameter φ is 5.5 mm; the maximum scan angle θ is 6.89°; the inter-surface separation L1 along the optical axis between the reflection surfaces of the first and second deflectors 33a, 33b is 10.0 mm; and the distance L2 along the optical axis from the reflection surface of the second deflector 33b to the plane P' conjugate to the entrance pupil of the objective lens 36 is 15.0 mm.

TABLE 1

|  | Incident and exiting light fluxes are parallel to each other | Incident and exiting light fluxes intersect each other |
| --- | --- | --- |
| Incident beam diameter φ [mm] | 5.5 | 5.5 |
| Maximum scan angle θ [°] | 6.89 | 6.89 |
| Effective diameter φ1 of first deflector [mm] | 8.6 | 6.2 |
| Effective diameter φ2 of second deflector [mm] | 13.2 | 10.0 |
| Separation L1 between reflection surface [mm] | 10.0 | 10.0 |
| Distance L2 between second deflector and pupil [mm] | 15.0 | 15.0 |

Further, as shown in FIG. 9B, when the light flux incident on the first deflector 33a and the light flux having exited from the second deflector 33b form an intersection angle of 90° and the light flux incident on the third deflector 33c and the light flux having exited from the fourth deflector 33d form an intersection angle of 90°, the scan optical system 30 according to the second embodiment can be employed without changing the other elements in the optical system at all because the direction of the incident light flux and the direction of the exiting light flux are the same as those in the usual two-dimensional scan optical system shown in FIG. 9A.

When a deflector is present in the position of the rotation center of the scanned light flux, in which a case the position where the deflector is disposed cannot be the position of the exit pupil of the objective lens 36, the second objective lens 35 and the pupil projection lens 36 (relay optical system) are disposed between the objective lens 36 and the deflector to form the exit pupil conjugate position in the vicinity of the deflector, whereby the position in the vicinity of the position of the rotation center of the scanned light flux is conjugate to the exit pupil of the objective lens 36. Providing a relay optical system is problematic in that the size of the microscope increases and aberrations produced by the relay optical system inevitably affect the performance of the microscope. When either the type I or V in the first embodiment (FIG. 4 or FIG. 3), in which no deflector is present in the position of the rotation center of the scanned light flux, the position of the rotation center of the scanned light flux can coincide with the position of the exit pupil of the objective lens 36, whereby the relay optical system is not necessarily provided and hence an adverse effect of aberrations can be avoided.

[Third Embodiment]

A description will next be made of a third embodiment in which the scan unit 33, which is the two-dimensional scan optical system having the configuration described above, is used in the scan optical system 30 in which a position conjugate to the exit pupil P varies. Specifically, the scan optical system 30 according to the third embodiment includes a magnification changing optical system 37 and the second objective lens 35 sequentially arranged from the object side between the objective lens 36 and the pupil projection lens 34, as shown in FIG. 10. In the following description, the magnification changing optical system 37 and the second objective lens 35 are collectively called a magnification changing second objective optical system 38. FIG. 10 shows the configuration of part of the optical system ranging from the exit pupil P of the objective lens 36 to an exit pupil image P''' relayed by the pupil projection lens 34. That is, FIG. 10 is an optical path diagram showing the optical path ranging from the object-side entrance pupil P of the magnification changing second objective optical system 38 to the exit pupil conjugate position P''' of the magnification changing second objective optical system 38 where the pupil projection lens 34 relays the pupil P. FIG. 10A shows a state in which the focal length f of the magnification changing second objective optical system 38 is 60 mm, and FIG. 10B shows a state in which the focal length f is 450 mm. FIGS. 10A and 10B clearly show that the relayed exit pupil conjugate position P''' changes with the focal length f of the magnification changing second objective optical system 38.

The magnification changing optical system 37, which forms the magnification changing second objective optical system 38, includes a first lens group G1 having positive refractive power, a second lens group G2 having negative refractive power, a third lens group G3 having negative refractive power, and a fourth lens group G4 having positive refractive power sequentially arranged from the object side.

The first lens group G1 includes a cemented lens formed of a negative meniscus lens L11 having a convex surface on the object side and a biconvex lens L12 cemented to each other and a positive meniscus lens L13 having a convex surface on the object side with the three lenses sequentially arranged from the object side. The second lens group G2 includes a biconcave lens L21, a cemented lens formed of a biconvex lens L22 and a biconcave lens L23 cemented to each other, and a biconcave lens L24 with the four lenses sequentially arranged from the object side. The third lens group G3 includes a biconvex lens L31 and a cemented lens formed of a biconvex lens L32 and a negative meniscus lens L33 having a concave surface on the object side cemented to each other with the three lenses sequentially arranged from the object side. The fourth lens group G4 includes a cemented lens formed of a positive meniscus lens L41 having a concave surface on the object side and a negative meniscus lens L42 having a concave surface on the object side cemented to each other with the two lenses sequentially arranged from the object side. The magnification changing optical system 37 is configured so that the second lens group G2 and the third lens group G3 are moved along the optical axis toward the image side when the magnification is changed from a high magnification end to a low magnification end, as shown in FIG. 10. The first lens group G1 and the fourth lens group G4 are stationary on the optical axis in the magnification changing process.

The second objective lens 35 includes a cemented lens formed of a biconvex lens L51 and a negative meniscus lens L52 having a concave surface on the object side cemented to each other and a cemented lens formed of a biconvex lens L53 and a biconcave lens L54 cemented to each other with the four lenses sequentially arranged from the object side.

The following Table 2 shows specification values of the magnification changing second objective optical system 38. In Table 2, in the overall specification section, f represents the focal length of the overall magnification changing second objective optical system 38 with an object positioned at infinity; Fno represents the F-number; and d0 represents the distance along the optical axis from the exit pupil P of the objective lens 36 to the lens surface closest to the object side (first surface) among the surfaces of the magnification changing second objective optical system 38. In the lens data section, a first column m shows the surface number of each optical surface along the direction in which rays travel from the object side; a second column r shows the radius of curvature of each optical surface; a third column d shows the distance along the optical axis from each optical surface to the following optical surface (intersurface separation that is lens thickness or air separation length along optical axis); and a fourth column vd and a fifth column nd show the Abbe number and the refractive index at the d line ($\lambda$=587.6 nm). The surface numbers 1 to 26 shown in Table 2 are defined so that the surface closest to the object side among the surfaces of the magnification changing optical system 37 in FIG. 10 is numbered 1 and the surface closest to the image side among the surfaces of the second objective lens 35 is numbered 26. Further, the negative sign (−) of the radius of curvature shows that the lens surface is concave toward the object side. Moreover, the refractive index of 1.0000 for air is omitted. Further, the intersurface separation d in the row of the 26-th surface represents the distance along the optical axis from the lens surface closest to the image side (26-th surface) among the surfaces of the magnification changing second objective optical system 38 (second objective lens 35) to the lens surface closest to the object side (27-th surface) among the surfaces of the pupil projection lens 34.

Further, in the magnification changing optical system 37, since the second lens group G2 and the third lens group G3 are moved along the optical axis when the magnification is changed from the high magnification end to the low magnification end as described above, the following separations change when the magnification is changed: the separation d1 between the first lens group G1 and the second lens group G2; the separation d2 between the second lens group G2 and the third lens group G3; and the separation d3 between the third lens group G3 and the fourth lens group G4. The interlens group separation section in Table 2 below shows the effective diameter Φ of the lens surface closest to the object side (first surface), the focal length f of the overall magnification changing second objective optical system 38, and the interlens group separations d1, d2, and d3 in a high magnification end state, an intermediate focal length state, and a low magnification end state. The effective diameter Φ of the first surface changes with magnification and serves as an object-side entrance pupil that determines the diameter of the light flux incident on the magnification changing optical system 37 for each focal length.

All the following specification values of the focal length f, the radius of curvature r, the intersurface separation d, and other lengths are typically expressed in the unit "mm" but not necessarily because an optical system provides comparable optical performance even when the optical system is proportionally enlarged of reduced. Further, the description of the above specification tables holds true for the following specification tables.

TABLE 1

| Overall specifications |
| --- |
| f = 60-450 |
| Fno = 10.0-22.5 |
| d0 = 15.0-15.0 |

| Lens data | | | | |
| --- | --- | --- | --- | --- |
| m | r | d | vd | nd |
| 1 | 120.1967 | 2.0000 | 39.57 | 1.804400 |
| 2 | 48.7980 | 3.0000 | 82.56 | 1.497820 |
| 3 | −509.0866 | 0.5000 | | |
| 4 | 50.4610 | 3.0000 | 82.56 | 1.497820 |
| 5 | 3179.8129 | d1 | | |
| 6 | −108.0082 | 1.5000 | 35.71 | 1.902650 |
| 7 | 25.8194 | 2.0000 | | |
| 8 | 32.8474 | 3.5000 | 23.78 | 1.846660 |
| 9 | −19.0003 | 1.0000 | 60.29 | 1.620410 |
| 10 | 31.8448 | 1.5000 | | |
| 11 | −25.9839 | 1.5000 | 35.71 | 1.902650 |
| 12 | 228.2515 | d2 | | |
| 13 | 838.2380 | 6.0000 | 82.56 | 1.497820 |
| 14 | −31.9728 | 0.2000 | | |
| 15 | 136.9685 | 6.0000 | 82.56 | 1.497820 |
| 16 | −39.2120 | 2.0000 | 28.55 | 1.795040 |
| 17 | −92.0449 | d3 | | |
| 18 | −339.8016 | 5.5000 | 36.24 | 1.620040 |
| 19 | −40.8020 | 1.5000 | 39.57 | 1.804400 |
| 20 | −124.4210 | 5.5017 | | |
| 21 | 327.0571 | 6.0000 | 71.34 | 1.569076 |
| 22 | −73.5845 | 3.0000 | 41.96 | 1.667551 |
| 23 | −186.9698 | 0.5000 | | |
| 24 | 140.9037 | 5.5000 | 71.34 | 1.569076 |
| 25 | −82.7373 | 2.5000 | 56.34 | 1.568832 |
| 26 | 418.3780 | 195.1762 | | |

TABLE 1-continued

| | Interlens group separation | | |
|---|---|---|---|
| | High magnification end | Intermediate focal length | Low magnification end |
| Φ | 6.0000 | 12.0000 | 20.0000 |
| f | 60.0000 | 150.0000 | 450.0000 |
| d1 | 2.6024 | 42.4730 | 60.3676 |
| d2 | 22.8372 | 18.1594 | 2.5051 |
| d3 | 43.3588 | 8.1659 | 5.9257 |

The pupil projection lens 34 includes a cemented lens formed of a biconcave lens L61 and a biconvex lens L62 cemented to each other and a positive meniscus lens L63 having a convex surface on the object side with the three lenses sequentially arranged from the object side. The following Table 3 shows specification values of the pupil projection lens 34. The pupil projection lens 34 is disposed on one side of the image I, which is formed by the magnification changing second objective optical system 38, in the direction away from the object side and relays the exit pupil of the magnification changing second objective optical system 38. The surface numbers 27 to 31 shown in Table 3 are defined so that the surface closest to the object side among the surfaces of the pupil projection lens 24 in FIG. 10 is numbered 27 and the surface closest to the image side is numbered 31.

TABLE 2

| m | r | d | νd | nd |
|---|---|---|---|---|
| 27 | −104.4668 | 2.0000 | 28.23 | 1.754521 |
| 28 | 128.4039 | 5.0000 | 70.33 | 1.487605 |
| 29 | −34.6546 | 1.0000 | | |
| 30 | 44.4201 | 3.0000 | 70.20 | 1.487825 |
| 31 | ∞ | | | |

A description will first be made of a case where the scan optical system 30 having the configuration described above and the second deflector 33b, which is a single reflection mirror device, form a one-dimensional scan optical system (the description will be made with reference to the X-scan optical system 33x, and the same holds true for the Y-scan optical system 33y). The second deflector 33b is disposed so that the rotation center thereof coincides with the relayed exit pupil conjugate position P''' in the case where the focal length f of the magnification changing second objective optical system 38 is 60 mm, that the light flux incident on the second deflector 33b and the light flux reflected off the second deflector 33b are perpendicular to each other, and that the reflected light flux forms an on-axis light flux in the magnification changing second objective optical system 38, as shown in FIG. 11A. When the second deflector 33b is caused to rotate from the state described above by 2.5°, the reflected light flux is incident on the pupil projection lens 38 in the form of an off-axis light flux inclined to the optical axis of the magnification changing second objective optical system 38 by 5°, as shown in FIG. 11B. Since the rotation center of the second deflector 33b coincides with the exit pupil conjugate position P''' of the magnification changing second objective optical system 38, substantially all the light fluxes including the on-axis and off-axis light fluxes can pass through the object-side entrance pupil P of the magnification changing second objective optical system 38.

On the other hand, even in a state in which the focal length f of the magnification changing second objective optical system 38 is changed to 450 mm with no change in the position of the second deflector 33b and when the light flux incident on the second deflector 33b is perpendicular to the light flux reflected off the second deflector 33b, the reflected light flux forms an on-axis light flux in the magnification changing second objective optical system 38 and can pass through the entrance pupil P of the magnification changing second objective optical system 38 as shown in FIG. 12A, but when the second deflector 33b is caused to rotate by 2.5°, an off-axis light flux does not fall within the effective diameter in the middle of the magnification changing second objective optical system 38, as shown in FIG. 12B, because the exit pupil conjugate position P''' of the magnification changing second objective optical system 38 does not coincides with the rotation center of the second deflector 33b.

To address the problem, the first deflector 33a is added and the two reflection mirrors form the one-dimensional scan optical system (X-scan optical system 33x), as shown in FIG. 13. In this configuration, the line segment (20 mm) that connects the rotation center of the first deflector 33a to the rotation center of the second deflector 33b is perpendicular to the optical axis of the magnification changing second objective optical system 38, and the light flux incident on the first deflector 33a is parallel to the optical axis of the magnification changing second objective optical system 38, as shown in FIG. 13A. Further, it is assumed as described above that the exit pupil conjugate position P''' in this state coincides with the rotation center of the second deflector 33b and the rotation center of the laser beam (illumination light) deflected off each of the first deflector 33a and the second deflector 33b. In this configuration, when the second deflector 33b is caused to rotate by 2.5°, an off-axis light flux incident on the pupil projection lens 34 is inclined to the optical axis of the magnification changing second objective optical system 38 by 5°, but substantially all the light fluxes including the on-axis and off-axis light fluxes can pass through the object-side entrance pupil P of the magnification changing second objective optical system 38 as shown in FIG. 13B, as in the case shown in FIGS. 11A and 11B. It is, however, noted that even when the exit pupil conjugate position P''' coincides with the rotation center of the second deflector 33b, but when the exit pupil conjugate position P''' does not coincide with the rotation center of the laser beam (illumination light) deflected off each of the first deflector 33a and the second deflector 33b, the off-axis light flux does not fall within the effective diameter in the middle of the magnification changing second objective optical system 38.

On the other hand, even in a state in which the focal length f of the magnification changing second objective optical system 38 is changed from this state to 450 mm, and when the light flux incident on the second deflector 33b is perpendicular to the light flux reflected off the second deflector 33b and the line segment that connects the rotation center of the first deflector 33a to the rotation center of the second deflector 33b is perpendicular to the optical axis of the magnification changing second objective optical system 38, the reflected light flux forms an on-axis light flux in the magnification changing second objective optical system 38 and can pass through the entrance pupil P of the magnification changing second objective optical system 38, as shown in FIG. 14A. When the rotation angle (rotation swing angle) of each of the first deflector 33a and the second deflector 33b is adjusted so that the rotation center of the laser beam (illumination light) deflected off each of the first deflector 33a and the second deflector 33b coincides with the exit pupil conjugate position P,''' and the off-axis light flux incident on the pupil projection lens 34 is inclined to the optical axis of the magnification changing second objective optical system 38 by 5°, the off-axis light flux can pass through the object-side entrance pupil P of the magnification changing second objective optical system 38 without being vignetted in the middle of the magnification changing second objective optical system 38, as shown in FIG. 14B. As described above, disposing the first deflector 33a and the second deflector 33b and setting the rotation center of the laser beam (illumination light) deflected off the two deflectors 33a and 33b to coincide with the exit pupil conjugate position P′′′ allows substantially all the light fluxes including the on-axis and off-axis light fluxes to pass through the object-side entrance pupil P of the magnification changing second objective optical system 38 irrespective of the focal length f of the magnification changing second objective optical system 38, for example, 60 mm or 450 mm.

A description will be made of an example of how to determine the rotation angle (rotation swing angle) of each of the first deflector 33a and the second deflector 33b in such a way that the rotation center of the laser beam (illumination light) deflected off each of the first deflector 33a and the second deflector 33b coincides with the exit pupil conjugate position P′′′, that is, the relationship between the rotation swing angles of the two deflectors 33a, 33b and the position of the rotation center of the laser beam (illumination light) deflected off the deflectors 33a and 33b. A description will first be made of the following case as an initial state: light incident on the X-scan optical system 33x, which is formed of the two deflectors 33a and 33b, passes through the rotation center of the deflectors 33a and 33b, and the light having exited from the X-scan optical system 33x travels along the optical axis of the magnification changing second objective optical system 38 as shown in FIG. 15A. Now, let A be the rotation center of the first deflector 33a; C be the rotation center of the second deflector 33b; and P′ be the rotation center of the laser beam deflected off the deflectors 33a and 33b (rotation center of X-scan optical system 33x). Further, let L be the distance between the rotation center A of the first deflector 33a and the rotation center C of the second deflector 33b, and M be the distance between the rotation center C of the second deflector 33b and the rotation center P′ of the X-scan optical system 33x. It is further assumed in the description that the clockwise direction is a positive direction in FIG. 15.

As shown in FIG. 15B, it is assumed that the first deflector 33a is caused to rotate by α/2 [°] from the initial state described above and the second deflector 33b is caused to rotate by β/2 [°] from the initial state. Further, let B be the position where the incident light reflected off the first deflector 33a is incident on the second deflector 33b, and A′ be a mirror image of the rotation center A of the first deflector 33a.

Since the point A′ is a mirror image of the point A as described above, in a triangle A′CP′, the length of the line segment A′C is L and the angle BA′C is a. The rotation center P′ of the X-scan optical system 33x is therefore fixed by determining the ray of a circle having a center that coincides with the rotation center C of the second deflector 33b and having a radius M and a straight line having a gradient tan α and a Y intercept L·tan α as shown in FIG. 16. It is assumed in FIGS. 15 and 16 that the y axis is the straight line CA, and that the x axis is the optical axis of the magnification changing second objective optical system 38. It is assumed that the line segment A′C is the x-axis and an axis, which passes through the point C and its perpendicular to the x-axis, is the y-axis.

$$X^2+Y^2=M^2$$

$$Y=\tan\alpha \cdot X + L\cdot\tan\alpha$$

X and Y are determined by solving the simultaneous equations described above. Further, in FIG. 15B but in the initial state described above, the mirror image A′ is formed on the optical axis and hence the angle ACA′ is 90 [°]. When the second deflector 33b is caused to rotate from this state by β/2 [°], the angle between the line A′C and the optical axis (acute angle) is β [0]. The angle β is the angle between the line P′C and the x axis (acute angle) in FIG. 16A and can therefore be determined by the following expression:

$$\beta = \operatorname{atan}\left(\frac{Y}{X}\right) = \operatorname{atan}\left(\frac{L\tan\alpha + \tan\alpha\sqrt{M^2(1+\tan^2\alpha)-L^2\tan^2\alpha}}{-L\tan^2\alpha + \sqrt{M^2(1+\tan^2\alpha)-L^2\tan^2\alpha}}\right)$$

Figure 16A:
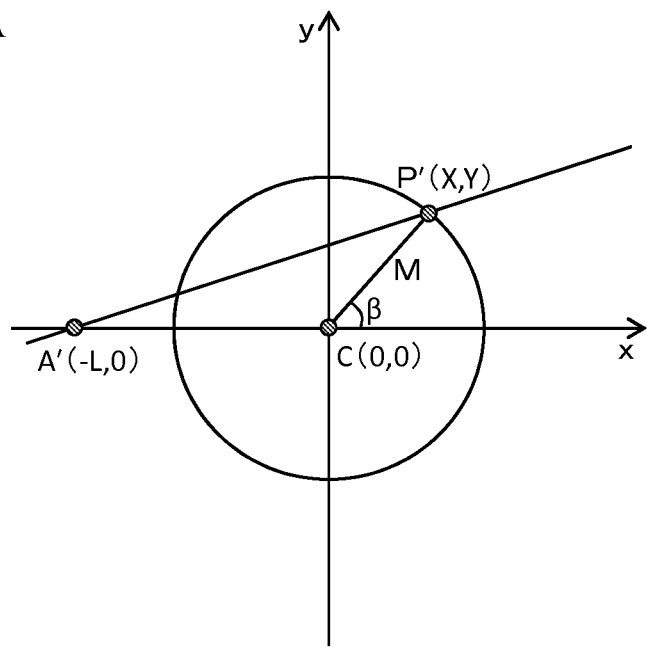
FIG. 16 (which includes FIGS. 16A and 16B) is a descriptive diagram showing the relationship between the rotation center of each of the first and second deflectors and the pivotal point of the illumination light deflected off the deflectors.
Figure 16B:
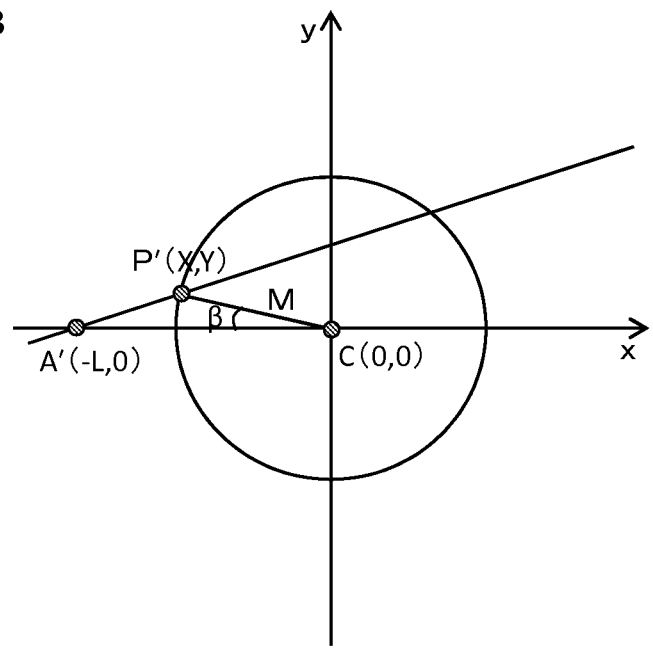
Figure 17:
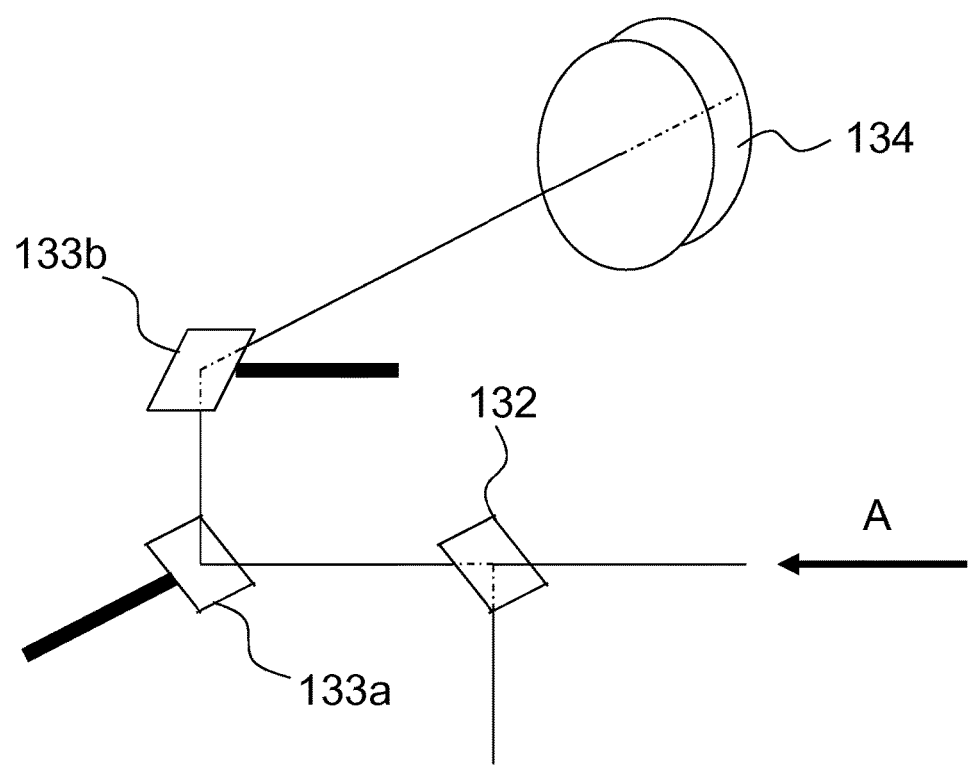
FIG. 17 is a descriptive diagram for describing the arrangement of deflectors in a conventional scanning microscope.

The above description with reference to FIG. 16A applies to a specific deflector arrangement, that is, the case where the rotation center P′ of the laser beam (illumination light) having exited out of the X-scan optical system 33x is located in a position away from the second deflector 33b toward the magnification changing second objective optical system 38. When the rotation center P′ is located in a position away from the second deflector 33b toward the first deflector 33a, the above description is made with reference to FIG. 16B. The following expression is therefore generally satisfied irrespective of the deflector arrangement.

$$\beta = \operatorname{atan}\left(\frac{L\tan\alpha \pm \tan\alpha\sqrt{M^2(1+\tan^2\alpha)-L^2\tan^2\alpha}}{-L\tan^2\alpha \pm \sqrt{M^2(1+\tan^2\alpha)-L^2\tan^2\alpha}}\right) \quad (1)$$

In Expression (1) described above, when the rotation center P′ of the laser beam (illumination light) having exited out of the X-scan optical system 33x is located in a position away from the second deflector 33b toward the magnification changing second objective optical system 38, the + sign of the ± sign in Expression (1) is employed, whereas when the rotation center P′ is located in a position away from the second deflector 33b toward the first deflector 33a, the − sign of the ± sign in Expression (1) is employed.

As described above, controlling the first and second deflectors 33a, 33b in such a way that α/2 and β/2, which are rotation angles (rotation swing angles) of the deflectors 33a and 33b, satisfy Expression (1) described above allows the deflection angle of the illumination light deflected off the deflectors 33a and 33b to be controlled and the laser beam (illumination light) to rotate around a desired rotation center P′. The positions of two points P′ are obtained from Expressions (b) and (c) described above as shown in FIG. 16, and two relationships between α and β in Expression (1) are derived accordingly. These values can be adequately used in accordance with the five types (types I to V) described in the first embodiment to place the rotation center in a desired position.

For example, in the example shown in FIG. 14 described above, when the first and second deflectors 33a, 33b are so disposed with respect to the on-axis light flux that the reflection surfaces of the deflectors and the optical axis form an angle of 45° as shown in FIG. 14A, the first deflector 33a is caused to rotate by 5.1° (the reflection surface and the optical axis form an angle of 50.1) and the second deflector 33b is caused to rotate by 2.6° (the reflection surface and the optical axis form an angle of 47.6°) in order to incline the off-axis light flux by 5° to the optical axis of the magnification changing second objective optical system 38 as shown in FIG. 14B.

REFERENCE SIGNS LIST

10 Scanning microscope
20 Light source
33 Scan unit
33a First deflector
33b Second deflector
33c Third deflector
33d Fourth deflector
36 Objective lens

The invention claimed is:

1. A scanning microscope comprising:
an objective lens that collects illumination light from a light source and irradiates a specimen with the illumination light; and
a scan unit that is disposed between the light source and the objective lens and scans the specimen with the illumination light, wherein
the scan unit two-dimensionally scans the illumination light over the specimen and
includes a first deflector and a second deflector that scan the illumination light in a first direction in the two-dimensional scanning,
the deflection angle of the illumination light deflected off each of the first deflector and the second deflector is controlled so that the pivotal point of the illumination light deflected off each of the first deflector and the second deflector substantially coincides with an exit pupil of the objective lens or a position conjugate to the exit pupil,
each of the first deflector and the second deflector has a reflection surface that rotates around an axis of the rotation substantially perpendicular to the first direction,
the first deflector reflects the illumination light, and the second deflector further reflects the illumination light reflected off the first deflector, and
the first deflector and the second deflector are controlled so that the amount of change from a predetermined state of the deflection angle of the illumination light deflected off each of the first deflector and the second deflector is controlled to satisfy the following conditional expression:

$$\beta = \operatorname{atan}\left(\frac{L\tan\alpha \pm \tan\alpha\sqrt{M^2(1+\tan^2\alpha) - L^2\tan^2\alpha}}{-L\tan^2\alpha \pm \sqrt{M^2(1+\tan^2\alpha) - L^2\tan^2\alpha}}\right)$$

where
α represents the amount of change from the predetermined state of the deflection angle of the illumination light deflected off the first deflector,
β represents the amount of change from the predetermined state of the deflection angle of the illumination light deflected off the second deflector,
L represents the distance between the rotation center of the first deflector and the rotation center of the second deflector, and
M represents the distance between the rotation center of the second deflector and the pivotal point of the illumination light deflected off each of the first deflector and the second deflector.

2. The scanning microscope according to claim 1, wherein the scan unit further includes a third deflector and a fourth deflector that scan the illumination light in a second direction perpendicular to the first direction,
the deflection angle of the illumination light deflected off each of the third deflector and the fourth deflector is controlled so that the pivotal point of the illumination light deflected off each of the third deflector and the fourth deflector substantially coincides with the exit pupil of the objective lens or the position conjugate to the exit pupil,
each of the third deflector and the fourth deflector has a reflection surface that rotates around an axis of the rotation substantially perpendicular to the second direction,
the third deflector reflects the illumination light, and the fourth deflector further reflects the illumination light reflected off the third deflector, and
the third deflector and the fourth deflector are controlled so that the amount of change from a predetermined state of the deflection angle of the illumination light deflected off each of the third deflector and the fourth deflector is controlled to satisfy the following conditional expression:

$$\beta = \operatorname{atan}\left(\frac{L\tan\alpha \pm \tan\alpha\sqrt{M^2(1+\tan^2\alpha) - L^2\tan^2\alpha}}{-L\tan^2\alpha \pm \sqrt{M^2(1+\tan^2\alpha) - L^2\tan^2\alpha}}\right)$$

where
α represents the amount of change from the predetermined state of the deflection angle of the illumination light deflected off the third deflector,
β represents the amount of change from the predetermined state of the deflection angle of the illumination light deflected off the fourth deflector,
L represents the distance between the rotation center of the third deflector and the rotation center of the fourth deflector, and
M represents the distance between the rotation center of the fourth deflector and the pivotal point of the illumination light deflected off each of the third deflector and the fourth deflector.

3. The scanning microscope according to claim 1, wherein the first deflector and the second deflector are disposed so that the incidence angle of the illumination light incident on the reflection surface of each of the first deflector and the second deflector is smaller than 45° when the illumination light travels along the optical axis of the objective lens.

4. The scanning microscope according to claim 2, wherein the third deflector and the fourth deflector are disposed so that the incidence angle of the illumination light incident on the reflection surface of each of the third deflector and the fourth deflector is smaller than 45° when the illumination light travels along the optical axis of the objective lens.

5. The scanning microscope according to claim 1, wherein the first deflector and the second deflector are disposed so that the illumination light incident on the reflection surface of the first deflector intersects the illumination light reflected off the reflection surface of the second deflector.

6. The scanning microscope according to claim 5, wherein the first deflector and the second deflector are disposed so that the illumination light incident on the reflection surface of the first deflector is substantially perpendicular to the illumination light reflected off the reflection surface of the second deflector.

7. The scanning microscope according to claim 2, wherein the third deflector and the fourth deflector are disposed so that the illumination light incident on the reflection surface of the third deflector intersects the illumination light reflected off the reflection surface of the fourth deflector.

8. The scanning microscope according to claim 7, wherein the third deflector and the fourth deflector are disposed so that the illumination light incident on the reflection surface of the third deflector is substantially perpendicular to the illumination light reflected off the reflection surface of the fourth deflector.

9. A scanning microscope comprising:
an objective lens that collects illumination light from a light source and irradiates a specimen with the illumination light; and
a scan unit that is disposed between the light source and the objective lens and scans the specimen with the illumination light, wherein
the scan unit includes a first deflector and a second deflector that scan the illumination light in a first direction in the specimen and a third deflector and a fourth deflector that scan the illumination light in a second direction perpendicular to the first direction, and
the deflection angle of the illumination light deflected off each of the first deflector, the second deflector, the third deflector, and the fourth deflector is controlled so that the pivotal point of the illumination light deflected off each of the first deflector and the second deflector and the pivotal point of the illumination light deflected off each of the third deflector and the fourth deflector substantially coincide with an exit pupil of the objective lens or a position conjugate to the exit pupil,
the scanning microscope further comprises a magnification changing optical system that changes the magnification of the scanning microscope so that an image of the specimen magnified accordingly is formed and moves the position conjugate to the exit pupil of the objective lens in accordance with the change in magnification, and
the deflection angle of the illumination light deflected off each of the first deflector, the second deflector, the third deflector, and the fourth deflector is so controlled in accordance with the movement of the position conjugate to the exit pupil of the objective lens that the pivotal point of the illumination light deflected off each of the first deflector and the second deflector and the pivotal point of the illumination light deflected off each of the third deflector and the fourth deflector substantially coincide with a position conjugate to the moved exit pupil.

10. The scanning microscope according to claim 9, wherein
the first deflector and the second deflector are disposed so that the pivotal point of the illumination light deflected off each of the first deflector and the second deflector is located in a position between a predetermined position away from the first deflector toward the light source side and a predetermined position away from the second deflector toward the specimen side, and
the third deflector and the fourth deflector are disposed so that the pivotal point of the illumination light deflected off each of the third deflector and the fourth deflector is located in a position between a predetermined position away from the third deflector toward the light source side and a predetermined position away from the fourth deflector toward the specimen side.

11. The scanning microscope according to claim 9, wherein
each of the first deflector and the second deflector has a reflection surface that rotates around an axis of the rotation substantially perpendicular to the first direction,
each of the third deflector and the fourth deflector has a reflection surface that rotates around an axis of the rotation substantially perpendicular to the second direction,
the first deflector reflects the illumination light incident from the light source, and the second deflector further reflects the illumination light reflected off the first deflector, and
the third deflector reflects the illumination light, and the fourth deflector further reflects the illumination light reflected off the third deflector.

12. The scanning microscope according to claim 11, wherein the first and second deflectors and the third and fourth deflectors are controlled so that the amount of change from a predetermined state of the deflection angle of the illumination light deflected off each of the first deflector and the second deflector and the amount of change from a predetermined state of the deflection angle of the illumination light deflected off each of the third deflector and the fourth deflector are controlled to satisfy the following conditional expression:

$$\beta = \operatorname{atan}\left(\frac{L\tan\alpha \pm \tan\alpha\sqrt{M^2(1+\tan^2\alpha) - L^2\tan^2\alpha}}{-L\tan^2\alpha \pm \sqrt{M^2(1+\tan^2\alpha) - L^2\tan^2\alpha}}\right)$$

where
α represents the amount of change from the predetermined state of the deflection angle of the illumination light deflected off the first deflector or the third deflector,
β represents the amount of change from the predetermined state of the deflection angle of the illumination light deflected off the second deflector or the fourth deflector,
L represents the distance between the rotation center of the first deflector and the rotation center of the second deflector or the distance between the rotation center of the third deflector and the rotation center of the fourth deflector, and
M represents the distance between the rotation center of the second deflector and the pivotal point of the illumination light deflected off each of the first deflector and the second deflector or the distance between the rotation center of the fourth deflector and the pivotal point of the illumination light deflected off each of the third deflector and the fourth deflector.

13. The scanning microscope according to claim 11, wherein the first deflector and the second deflector are disposed so that the incidence angle of the illumination light incident on the reflection surface of each of the first deflector and the second deflector is smaller than 45° when the illumination light travels along the optical axis of the objective lens.

14. The scanning microscope according to claim 11, wherein the third deflector and the fourth deflector are disposed so that the incidence angle of the illumination light incident on the reflection surface of each of the third deflector and the fourth deflector is smaller than 45° when the illumination light travels along the optical axis of the objective lens.

15. The scanning microscope according to claim 11, wherein the first deflector and the second deflector are disposed so that the illumination light incident on the reflection surface of the first deflector intersects the illumination light reflected off the reflection surface of the second deflector.

16. The scanning microscope according to claim 15, wherein the first deflector and the second deflector are disposed so that the illumination light incident on the reflection surface of the first deflector is substantially perpendicular to the illumination light reflected off the reflection surface of the second deflector.

17. The scanning microscope according to claim 11, wherein the third deflector and the fourth deflector are disposed so that the illumination light incident on the reflection surface of the third deflector intersects the illumination light reflected off the reflection surface of the fourth deflector.

18. The scanning microscope according to claim 17, wherein the third deflector and the fourth deflector are disposed so that the illumination light incident on the reflection surface of the third deflector is substantially perpendicular to the illumination light reflected off the reflection surface of the fourth deflector.

* * * * *